United States Patent
Ho et al.

(10) Patent No.: US 8,014,416 B2
(45) Date of Patent: Sep. 6, 2011

(54) HD PHYSICAL LAYER OF A WIRELESS COMMUNICATION DEVICE

(75) Inventors: Keangpo Ricky Ho, San Jose, CA (US); Karim Nassiri-Toussi, Belmont, CA (US); Dengwei Fu, Cupertino, CA (US); Stephen P. Pope, Berkeley, CA (US); Jeffrey M. Gilbert, Palo Alto, CA (US); Chuen-Shen Shung, San Jose, CA (US); Jianhan Liu, Sunnyvale, CA (US)

(73) Assignee: Sibeam, Inc., Sunnyvale, CA (US)

(*) Notice: Subject to any disclaimer, the term of this patent is extended or adjusted under 35 U.S.C. 154(b) by 1179 days.

(21) Appl. No.: 11/706,470

(22) Filed: Feb. 13, 2007

(65) Prior Publication Data
US 2009/0323563 A1    Dec. 31, 2009

Related U.S. Application Data

(60) Provisional application No. 60/773,413, filed on Feb. 14, 2006, provisional application No. 60/744,012, filed on Feb. 15, 2006, provisional application No. 60/808,185, filed on May 23, 2006, provisional application No. 60/850,116, filed on Oct. 5, 2006, provisional application No. 60/856,060, filed on Nov. 1, 2006.

(51) Int. Cl.
*H04L 12/28* (2006.01)
(52) U.S. Cl. .................. 370/431; 375/260
(58) Field of Classification Search .......... 370/200–253, 370/280, 342, 347, 352, 328, 335, 468, 357, 370/84, 536–545, 395.64, 431; 455/126, 455/33.1; 375/240.01, 260–267
See application file for complete search history.

(56) References Cited

U.S. PATENT DOCUMENTS

| | | | |
|---|---|---|---|
| 5,369,671 A | * | 11/1994 | Yehushua et al. ............. 375/341 |
| 5,966,384 A | | 10/1999 | Felix et al. |
| 5,986,972 A | | 11/1999 | Li |

(Continued)

FOREIGN PATENT DOCUMENTS

EP    1 601 118    11/2005
(Continued)

OTHER PUBLICATIONS

K. Tsie et al, "Concatenated Trellis-Coded 8-Ary PSk for Land Mobile Satellite Communications", Discovering a New World of Communications, Chicago, Jun. 14-18, 1992, Bound Together with B0190700, Proceedings of the International Conference on Communications, New York, IEEE, vol. 4, Jun. 1992, pp. 778-782, XP010062007, ISBN: 0-7803-0599-X.

(Continued)

*Primary Examiner* — Ricky Ngo
*Assistant Examiner* — Iqbal Zaidi
(74) *Attorney, Agent, or Firm* — Blakely, Sokoloff, Taylor & Zafman LLP

(57) ABSTRACT

A radio frequency (RF) transmitter is coupled to and controlled by a processor to transmit data. A physical layer circuit is coupled to the RF transmitter to encode and decode between a digital signal and a modulated analog signal. The physical layer circuit comprises a high rate physical layer circuit (HRP) and a low rate physical layer circuit (LRP). The low rate channels generated by the low rate physical layer circuit (LRP) share a same frequency band as a corresponding high rate channel generated by the high rate physical layer circuit (HRP).

68 Claims, 27 Drawing Sheets

U.S. PATENT DOCUMENTS

| | | |
|---|---|---|
| 6,208,624 B1 * | 3/2001 | Tanno et al. .................. 370/280 |
| 6,807,145 B1 | 10/2004 | Weerackody et al. |
| 6,847,622 B1 * | 1/2005 | Emmons et al. ............. 370/335 |
| 2001/0004761 A1 | 6/2001 | Zehavi |
| 2002/0024937 A1 * | 2/2002 | Barnard et al. .............. 370/278 |
| 2002/0141433 A1 * | 10/2002 | Kwon et al. .................. 370/441 |
| 2003/0169769 A1 | 9/2003 | Ho et al. |
| 2004/0057455 A1 * | 3/2004 | Choi ............................. 370/463 |
| 2004/0261002 A1 | 12/2004 | Eidson et al. |
| 2005/0036524 A1 * | 2/2005 | Wojtowicz ................... 370/537 |
| 2006/0023802 A1 | 2/2006 | Balakrishnan et al. |
| 2006/0150054 A1 * | 7/2006 | Chen ............................. 714/752 |
| 2006/0209892 A1 | 9/2006 | MacMullan et al. |
| 2007/0024506 A1 * | 2/2007 | Hardacker ............ 343/700 MS |
| 2008/0266160 A1 * | 10/2008 | Goodall et al. ............... 341/155 |

FOREIGN PATENT DOCUMENTS

| | | |
|---|---|---|
| GB | 2 363 256 | 12/2001 |
| WO | WO 95-09490 | 4/1995 |
| WO | WO 95/12927 | 5/1995 |
| WO | WO 01/50637 | 7/2001 |
| WO | WO 01/69814 | 9/2001 |
| WO | WO 2005/064867 | 7/2005 |
| WO | WO 2007/021891 | 2/2007 |
| WO | WO 2007/050949 | 5/2007 |

OTHER PUBLICATIONS

PCT International Search Report for PCT Appln. No. US2007/003997, mailed Oct. 15, 2007, 10 Pages.

PCT Written Opinion for PCT/US2007/003997, mailed Oct. 15, 2007, 13 Pages.

* cited by examiner

Table 602:

| Parameters | Value |
|---|---|
| Data Bandwidth | 1.74 GHz |
| Sampling Rate | 2.508 GHz |
| Number of Subcarriers | 512 |
| Subcarrier spacing | 4.898 GHz |
| FFT period | 204.15 ns |
| Guard interval | 25.52 ns |
| Symbol duration | 229.67 ns |

Table 604:

| Parameters | Value |
|---|---|
| Data carriers | 336 |
| DC carriers | 3 |
| Pilot carriers | 16 |
| Null carriers | 157 |
| Modulation | QPSK, 16QAM |
| Outer block code | RS(224, 216) rate 0.96 |
| Inner code | 1/3, 2/3 (EEP) 4/5, 4/7 (UEP) |

Table 606:

| Supported Rates | | Modulation | Inner FEC | Outer FEC | PHY Rate | Necessary User Rate | AWGN SNR $10^{-7}$ BER |
|---|---|---|---|---|---|---|---|
| Full | EEP | 16QAM | 2/3 | 0.96 | 3.761 Gbps | 3.026 Gbps (1080p + Audio) | < 11dB |
| | UEP | | 4/7, 4/5 | | | | ~10dB, 13dB |
| Half | EEP | QPSK | 2/3 | 0.96 | 1.881 Gbps | 1.533 Gbps (1080i + Audio) | < 5dB |
| | UEP | | 4/7, 4/5 | | | | ~4dB, 7dB |
| Quart | EEP | QPSK | 1/3 | 0.96 | 0.940 Gbps | 0.482 Gbps (480p + Audio) | < 1dB |

FIG. 6

| Code Rate r | Puncturing pattern | Transmitted sequence |
|---|---|---|
| 1/3 | X: 1<br>Y: 1<br>Z: 1 | $X_1Y_1Z_1$ |
| 4/7 | X: 1111<br>Y: 1011<br>Z: 0000 | $X_1Y_1X_2X_3Y_3X_4Y_4$ |
| 2/3 | X: 11<br>Y: 10<br>Z: 00 | $X_1Y_1Z_2$ |
| 4/5 | X: 1111<br>Y: 1000<br>Z: 0000 | $X_1Y_1X_2X_3X_4$ |

| Data Rate Mode | Modulation | FEC | PHY Rate (Mbps) | | Replication Omni/BF |
|---|---|---|---|---|---|
| | | | Omni | Beam-Formed | |
| 0 | BPSK | 1/3 | 2.512 | 20.096 | 8x / 1x |
| 1 | BPSK | 1/2 | 3.768 | 30.144 | 8x / 1x |
| 2 | BPSK | 2/3 | 5.024* | 40.192 | 8x / 1x |
| 3 | BPSK | 2/3 | 10.048* | - | 4x / - |

Short Header Format #1
(15 bit coded into 1 symbol with rate-1/2 tail biting FEC)

HD PHYSICAL LAYER OF A WIRELESS COMMUNICATION DEVICE

RELATED APPLICATIONS

This application claims the benefit of U.S. Provisional Application No. 60/773,413 filed on Feb. 14, 2006, U.S. Provisional Application No. 60/774,012 filed on Feb. 15, 2006, U.S. Provisional Application No. 60/808,185 filed on May 23, 2006, U.S. Provisional. Application No. 60/850,116 filed on Oct. 5, 2006, U.S. Provisional Application No. 60/856,060 filed on Nov. 1, 2006, the contents of which are incorporated herein by reference.

FIELD OF THE INVENTION

The present invention relates to the field of wireless communication; more particularly, the present invention relates to a wireless communication device that uses adaptive beamforming.

BACKGROUND OF THE INVENTION

In 1998, the Digital Display Working Group (DDWG) was formed to create a universal interface standard between computers and displays to replace the analog VGA connection standard. The resulting standard was the Digital Visual Interface (DVI) specification, released in April 1999.

There are a number of content protection schemes available. For example, HDCP and DTCP are well-known content protection schemes. HDCP was proposed as a security component for DVI and was designed for digital video monitor interfaces.

HDMI is a connection interface standard that was developed to meet the explosive demand for high-definition audio and video. HDMI is capable of carrying video and audio and is backward-compatible with DVI (which carries only video signals). The key advantage of DVI and HDMI is that both of them are capable of transmitting uncompressed high-definition digital streams via a single cable.

HDCP is a system for protecting content being transferred over DVI and HDMI from being copied. See HDCP 1.0 for details. HDCP provides authentication, encryption, and revocation. Specialized circuitry in the playback device and in the display monitor encrypts video data before it is sent over. With HDCP, content is encrypted immediately before (or inside) the DVI or HDMI transmitter chip and decrypted immediately after (or inside) the DVI or HDMI receiver chip.

In addition to the encryption and decryption functions, HDCP implements authentication to verify that the receiving device (e.g., a display, a television, etc.) is licensed to receive encrypted content. Re-authentication occurs approximately every two seconds to continuously confirm the security of the DVI or HDMI interface. If, at any time, re-authentication does not occur, for example by disconnecting a device and/or connecting an illegal recording device, the source device (e.g., a DVD player, a set-top box, etc.) ends transmission of encrypted content.

While discussions of HDMI and DVI are generally focused on wired communication, the use of wireless communication to transmit content has become more prevalent every day. While much of the current focus is on cellular technologies and wireless networks, there has been a growing interest in the unlicensed spectrum around 60 GHz for wireless video transmission or very high-speed networking. More specifically, seven GHz of contiguous bandwidth has been opened for unlicensed use at millimeter-wave frequencies around 60 GHz in the U.S. and Japan.

SUMMARY OF THE INVENTION

A radio frequency (RF) transmitter is coupled to and controlled by a processor to transmit data. A physical layer circuit is coupled to the RF transmitter to encode and decode between a digital signal and a modulated analog signal. The physical layer circuit comprises a high rate physical layer circuit (HRP) and a low rate physical layer circuit (LRP). The low rate channels generated by the low rate physical layer circuit (LRP) share a same frequency band as a corresponding high rate channel generated by the high rate physical layer circuit (HRP).

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 6 is a block diagram of one embodiment of high rate packets (HRP) parameters for the wireless HD communication system of FIG. 1.

FIG. 15 is a table of low rate packet (LRP) data rates of the wireless HD communication system of FIG. 1.

DETAILED DESCRIPTION OF THE PRESENT INVENTION

Figure 1:
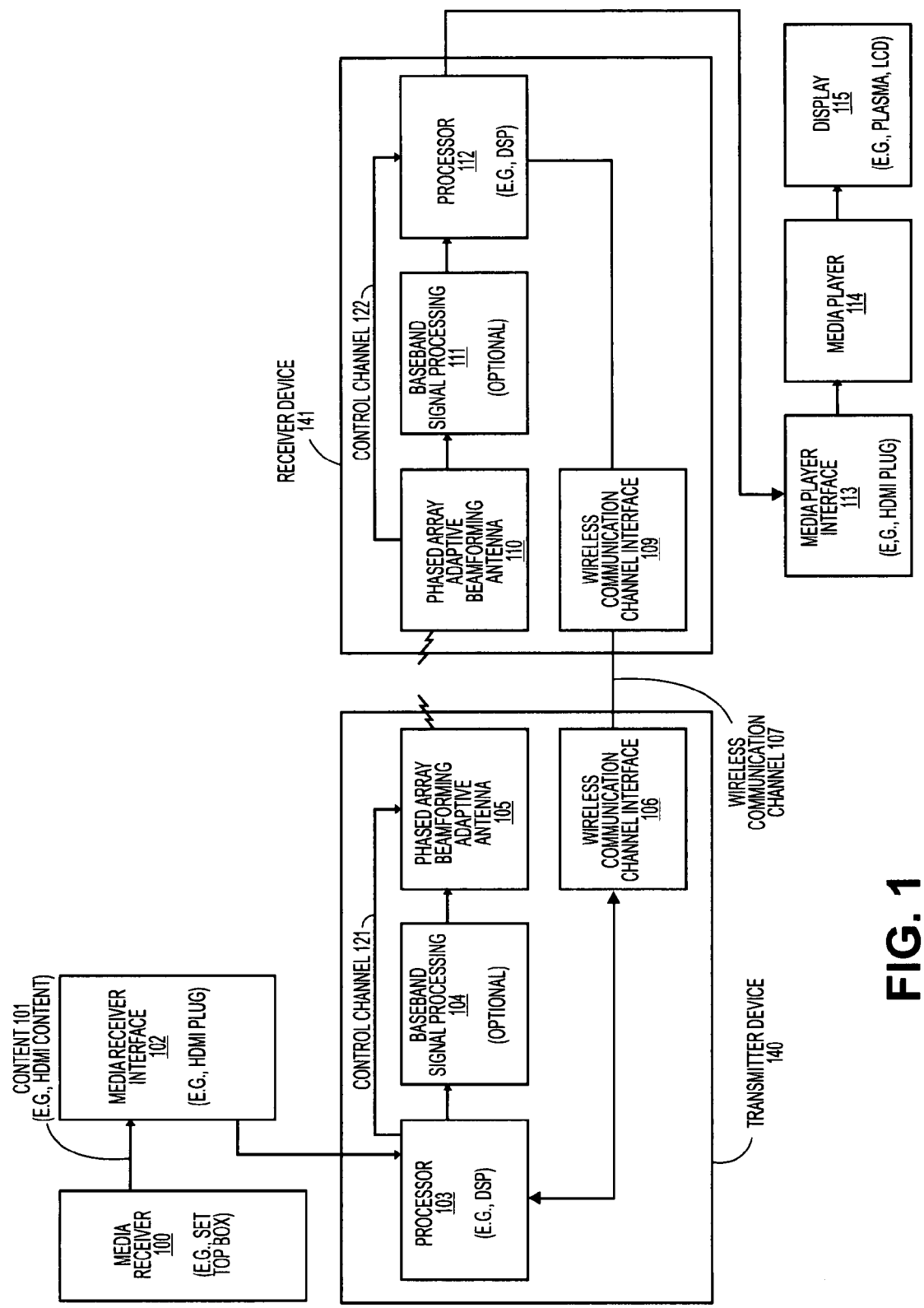
FIG. 1 is a block diagram of one embodiment of a communication system.

An apparatus and method for wireless communication is disclosed. In one embodiment, the wireless communication occurs using a wireless transceiver with an adaptive beamforming antenna. As would be apparent to one skilled in the art, the wireless communication could occur with a wireless receiver or transmitter.

In one embodiment, the wireless communication includes an additional link, or channel, for transmitting information between a transmitter and a receiver. The link may be unidirectional or bi-directional. In one embodiment, the channel is used to send antenna information back from a receiver to a transmitter to enable the transmitter to adapt its antenna array by steering the antenna elements to find a path to another direction. This may be obstacle avoidance.

In one embodiment, the link is also used to transfer information corresponding to the content that is being transferred wirelessly (e.g., wireless video). This information may be content protection information. For example, in one embodiment, the link is used to transfer encryption keys and acknowledgements of encryption keys when the transceivers are transferring HDMI data. Thus, in one embodiment, the link transfers control information and content protection information.

This additional link may be a separate channel in the 60 GHz band. In an alternative embodiment, the link may be a wireless channel in the 2.4 or 5 GHz band.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An Example of a Communication System

FIG. 1 is a block diagram of one embodiment of a communication system. Referring to FIG. 1, the system comprises media receiver 100, a media receiver interface 102, a transmitting device 140, a receiving device 141, a media player interface 113, a media player 114 and a display 115.

Media receiver 100 receives content from a source (not shown). In one embodiment, media receiver 100 comprises a set top box. The content may comprise baseband digital video, such as, for example, but not limited to, content adhering to the HDMI or DVI standards. In such a case, media receiver 100 may include a transmitter (e.g., an HDMI transmitter) to forward the received content.

Media receiver 101 sends content 101 to transmitter device 140 via media receiver interface 102. In one embodiment, media receiver interface 102 includes logic that converts content 101 into HDMI content. In such a case, media receiver interface 102 may comprise an HDMI plug and content 101 is sent via a wired connection; however, the transfer could occur through a wireless connection. In another embodiment, content 101 comprises DVI content.

In one embodiment, the transfer of content 101 between media receiver interface 102 and transmitter device 140 occurs over a wired connection; however, the transfer could occur through a wireless connection.

Transmitter device 140 wirelessly transfers information to receiver device 141 using two wireless connections. One of the wireless connections is through a phased array antenna with adaptive beamforming. The other wireless connection is via wireless communications channel 107, referred to herein as the back channel. In one embodiment, wireless communications channel 107 is uni-directional. In an alternative embodiment, wireless communications channel 107 is bi-directional.

Receiver device 141 transfers the content received from transmitter device 140 to media player 114 via media player interface 113. In one embodiment, the transfer of the content between receiver device 141 and media player interface 113 occurs through a wired connection; however, the transfer could occur through a wireless connection. In one embodiment, media player interface 113 comprises an HDMI plug. Similarly, the transfer of the content between media player interface 113 and media player 114 occurs through a wired connection; however, the transfer could occur through a wireless connection.

Media player 114 causes the content to be played on display 115. In one embodiment, the content is HDMI content and media player 114 transfer the media content to display via a wired connection; however, the transfer could occur through a wireless connection. Display 115 may comprise a plasma display, an LCD, a CRT, etc.

Note that the system in FIG. 1 may be altered to include a DVD player/recorder in place of a DVD player/recorder to receive, and play and/or record the content.

Figure 3:
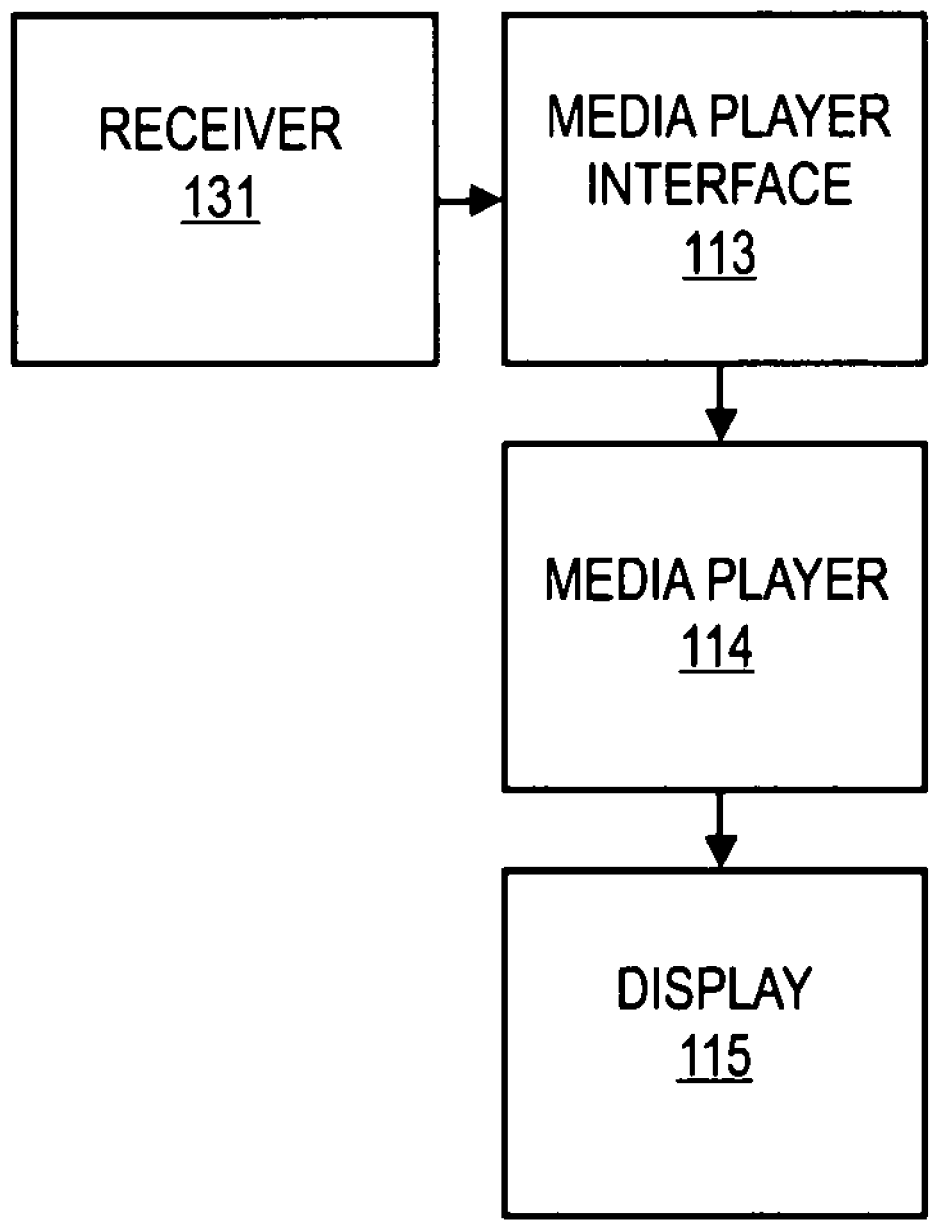
FIG. 3 is a block diagram of one embodiment of a peripheral device.

In one embodiment, transmitter 140 and media receiver interface 102 are part of media receiver 100. Similarly, in one embodiment, receiver 140, media player interface 113, and media player 114 are all part of the same device. In an alternative embodiment, receiver 140, media player interface 113, media player 114, and display 115 are all part of the display. An example of such a device is shown in FIG. 3.

In one embodiment, transmitter device 140 comprises a processor 103, an optional baseband processing component 104, a phased array antenna 105, and a wireless communication channel interface 106. Phased array antenna 105 comprises a radio frequency (RF) transmitter having a digitally controlled phased array antenna coupled to and controlled by processor 103 to transmit content to receiver device 141 using adaptive beamforming.

In one embodiment, receiver device 141 comprises a processor 112, an optional baseband processing component 111, a phased array antenna 110, and a wireless communication channel interface 109. Phased array antenna 110 comprises a radio frequency (RF) transmitter having a digitally controlled phased array antenna coupled to and controlled by processor 112 to receive content from transmitter device 140 using adaptive beamforming.

In one embodiment, processor 103 generates baseband signals that are processed by baseband signal processing 104 prior to being wirelessly transmitted by phased array antenna 105. In such a case, receiver device 141 includes baseband signal processing to convert analog signals received by phased array antenna 110 into baseband signals for processing by processor 112. In one embodiment, the baseband signals are orthogonal frequency division multiplex (OFDM) signals. In one embodiment, the baseband signals are single carrier phase, amplitude, or both phase and amplitude modulated signals.

In one embodiment, transmitter device 140 and/or receiver device 141 are part of separate transceivers.

Transmitter device 140 and receiver device 141 perform wireless communication using phased array antenna with adaptive beamforming that allows beam steering. Beamforming is well known in the art. In one embodiment, processor 103 sends digital control information to phased array antenna 105 to indicate an amount to shift one or more phase shifters in phased array antenna 105 to steer a beam formed thereby in a manner well-known in the art. Processor 112 uses digital control information as well to control phased array antenna 110. The digital control information is sent using control channel 121 in transmitter device 140 and control channel 122 in receiver device 141. In one embodiment, the digital control information comprises a set of coefficients. In one embodiment, each of processors 103 and 112 comprises a digital signal processor.

Wireless communication link interface 106 is coupled to processor 103 and provides an interface between wireless communication link 107 and processor 103 to communicate antenna information relating to the use of the phased array antenna and to communicate information to facilitate playing the content at another location. In one embodiment, the information transferred between transmitter device 140 and receiver device 141 to facilitate playing the content includes encryption keys sent from processor 103 to processor 112 of receiver device 141 and one or more acknowledgments from processor 112 of receiver device 141 to processor 103 of transmitter device 140.

Wireless communication link 107 also transfers antenna information between transmitter device 140 and receiver device 141. During initialization of the phased array antennas 105 and 110, wireless communication link 107 transfers information to enable processor 103 to select a direction for the phased array antenna 105. In one embodiment, the information includes, but is not limited to, antenna location information and performance information corresponding to the antenna location, such as one or more pairs of data that include the position of phased array antenna 110 and the signal strength of the channel for that antenna position. In another embodiment, the information includes, but is not limited to, information sent by processor 112 to processor 103 to enable processor 103 to determine which portions of phased array antenna 105 to use to transfer content.

When the phased array antennas 105 and 110 are operating in a mode during which they may transfer content (e.g., HDMI content), wireless communication link 107 transfers an indication of the status of communication path from the processor 112 of receiver device 141. The indication of the status of communication comprises an indication from processor 112 that prompts processor 103 to steer the beam in another direction (e.g., to another channel). Such prompting may occur in response to interference with transmission of portions of the content. The information may specify one or more alternative channels that processor 103 may use.

In one embodiment, the antenna information comprises information sent by processor 112 to specify a location to which receiver device 141 is to direct phased array antenna 110. This may be useful during initialization when transmitter device 140 is telling receiver device 141 where to position its antenna so that signal quality measurements can be made to identify the best channels. The position specified may be an exact location or may be a relative location such as, for example, the next location in a predetermined location order being followed by transmitter device 140 and receiver device 141.

In one embodiment, wireless communications link 107 transfers information from receiver device 141 to transmitter device 140 specifying antenna characteristics of phased array antenna 110, or vice versa.

An Example of a Transceiver Architecture

Figure 2:
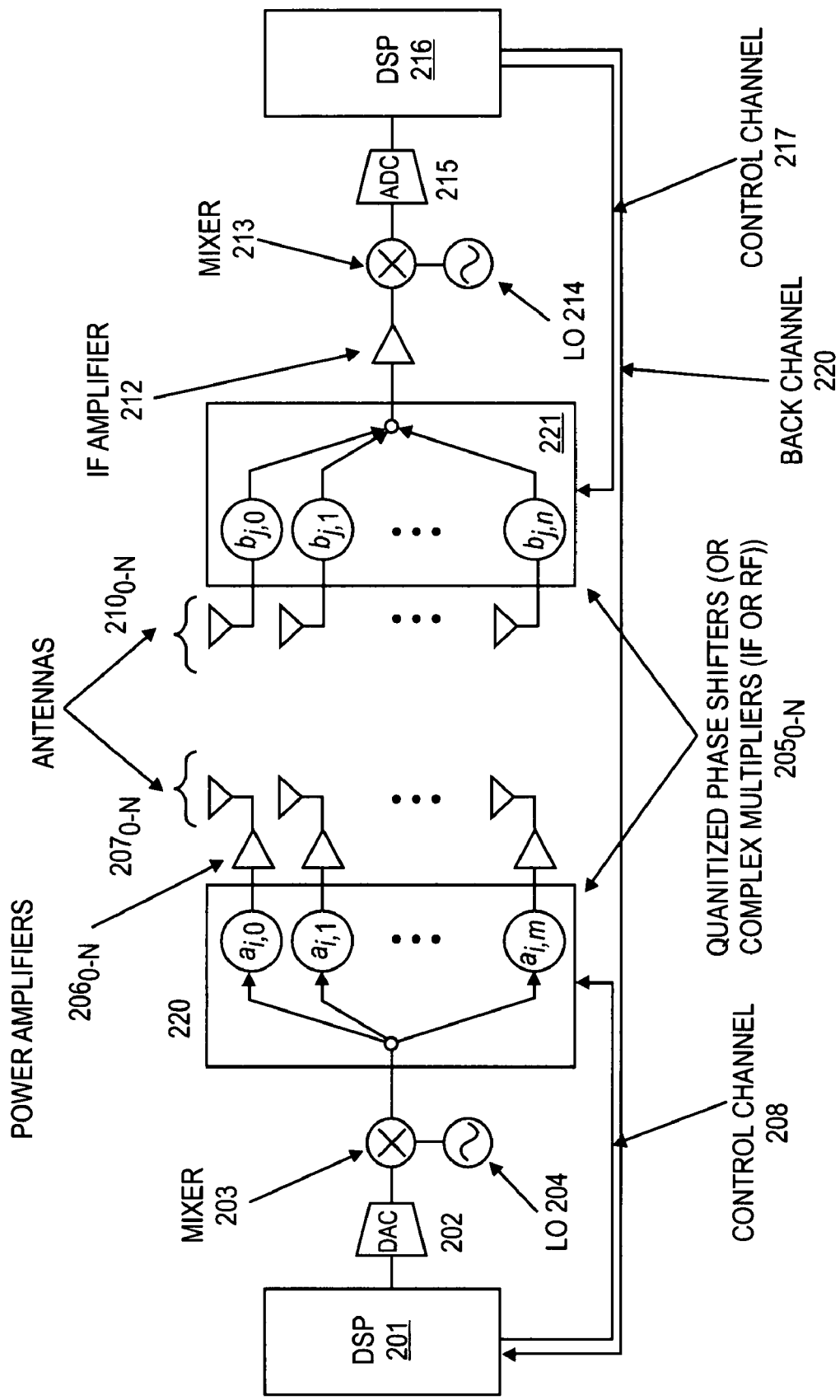
FIG. 2 is a more detailed block diagram of one embodiment of the communication system.

FIG. 2 is a block diagram of one embodiment of an adaptive beam forming multiple antenna radio system containing transmitter device 140 and receiver device 141 of FIG. 1. Transceiver 200 includes multiple independent transmit and receive chains. Transceiver 200 performs phased array beam forming using a phased array that takes an identical RF signal and shifts the phase for one or more antenna elements in the array to achieve beam steering.

Referring to FIG. 2, Digital Signal Processor (DSP) 201 formats the content and generates real time baseband signals. DSP 201 may provide modulation, FEC coding, packet assembly, interleaving and automatic gain control.

DSP 201 then forwards the baseband signals to be modulated and sent out on the RF portion of the transmitter. In one embodiment, the content is modulated into OFDM signals in a manner well known in the art.

Digital-to-analog converter (DAC) 202 receives the digital signals output from DSP 201 and converts them to analog signals. In one embodiment, the signals output from DAC 202 are between 0-256 MHz signals. In an alternative embodiment, the signals output from DAC 202 are between 0-750 MHz signals.

Mixer 203 receives signals output from DAC 202 and combines them with a signal from a local oscillator (LO) 204. The signals output from mixer 203 are at an intermediate frequency. In one embodiment, the intermediate frequency is between 2-15 GHz.

Multiple phase shifters $205_{0-N}$ receive the output from mixer 203. A demultiplier is included to control which phase shifters receive the signals. In one embodiment, these phase shifters are quantized phase shifters. In an alternative embodiment, the phase shifters may be replaced by complex multipliers. In one embodiment, DSP 201 also controls, via control channel 208, the phase and magnitude of the currents in each of the antenna elements in phased array antenna 220 to produce a desired beam pattern in a manner well-known in the art. In other words, DSP 201 controls the phase shifters $205_{0-N}$ of phased array antenna 220 to produce the desired pattern.

Each of phase shifters $205_{0-N}$ produce an output that is sent to one of power amplifiers $206_{0-N}$, which amplify the signal. The amplified signals are sent to antenna array 207 which has multiple antenna elements $207_{0-N}$. In one embodiment, the signals transmitted from antennas $207_{0-N}$ are radio frequency signals between 56-64 GHz. Thus, multiple beams are output from phased array antenna 220.

With respect to the receiver, antennas $210_{0-N}$ receive the wireless transmissions from antennas $207_{0-N}$ and provide them to phase shifters $210_{0-N}$. As discussed above, in one embodiment, phase shifters $211_{0-N}$ comprise quantitized phase shifters. Alternatively, phase shifters $211_{0-N}$ may be replaced by complex multipliers. Phase shifters $211_{0-N}$ receive the signals from antennas $210_{0-N}$, which are combined to form a single line feed output. In one embodiment, a multiplexer is used to combine the signals from the different elements and output the single feed line. The output of phase shifters $211_{0-N}$ is input to intermediate frequency (IF) amplifier 212, which reduces the frequency of the signal to an intermediate frequency. In one embodiment, the intermediate frequency is between 2-9 GHz.

Mixer 213 receives the output of the IF amplifier 212 and combines it with a signal from LO 214 in a manner well-known in the art. In one embodiment, the output of mixer 213 is a signal in the range of 0 to about 250 MHz. In one embodiment, there are I and Q signals for each channel. In an alternative embodiment, the output of mixer 213 is a signal in the range of 0 to about 750 MHz.

Analog-to-digital converter (ADC) 215 receives the output of mixer 213 and converts it to digital form. The digital output from ADC 215 is received by DSP 216. DSP 216 restores the amplitude and phase of the signal. DSPs 211 may provide demodulation, packet disassembly, de-interleaving, FEC decoding, and automatic gain control.

In one embodiment, each of the transceivers includes a controlling microprocessor that sets up control information for DSP. The controlling microprocessor may be on the same die as the DSP.

DSP-Controlled Adaptive Beam Forming

In one embodiment, the DSPs implement an adaptive algorithm with the beam forming weights being implemented in hardware. That is, the transmitter and receiver work together to perform the beam forming in RF frequency using digitally controlled analog phase shifters; however, in an alternative embodiment, the beamforming is performed in IF. Phase shifters $205_{0-N}$ and $211_{0-N}$ are controlled via control channel 208 and control channel 217, respectfully, via their respective DSPs in a manner well known in the art. For example, DSP 201 controls phase shifters $105_{0-N}$ to have the transmitter perform adaptive beamforming to steer the beam while DSP 211 controls phase shifters $211_{0-N}$ to direct antenna elements to receive the wireless transmission from antenna elements and combine the signals from different elements to form a single line feed output. In one embodiment, a multiplexer is used to combine the signals from the different elements and output the single feed line.

DSP 201 performs the beam steering by pulsing, or energizing, the appropriate phase shifter connected to each antenna element. The pulsing algorithm under DSP 201 controls the phase and gain of each element. Performing DSP controlled phase array beamforming is well known in the art.

The adaptive beam forming antenna is used to avoid interfering obstructions. By adapting the beam forming and steering the beam, the communication can occur avoiding obstructions which may prevent or interfere with the wireless transmissions between the transmitter and the receiver.

In one embodiment, with respect to the adaptive beamforming antennas, they have three phases of operations. The three phases of operations are the training phase, a searching phase, and a tracking phase. The training phase and searching phase occur during initialization. The training phase determines the channel profile with predetermined sequences of spatial patterns $\{A_i\}$ and $\{B_j\}$. The searching phase computes a list of candidate spatial patterns $\{A_i\}$, $\{B_j\}$ and selects a prime candidate $\{A_{\hat{0}}, B_{\hat{0}}\}$ for use in the data transmission between the transmitter of one transceiver and the receiver of another. The tracking phase keeps track of the strength of the candidate list. When the prime candidate is obstructed, the next pair of spatial patterns is selected for use.

In one embodiment, during the training phase, the transmitter sends out a sequence of spatial patterns $\{A_i\}$. For each spatial pattern $\{A_i\}$, the receiver projects the received signal onto another sequence of patterns $\{B_j\}$. As a result of the projection, a channel profile is obtained over the pair $\{A_i\}$, $\{B_j\}$.

In one embodiment, an exhaustive training is performed between the transmitter and the receiver in which the antenna of the receiver is positioned at all locations and the transmitter sending multiple spatial patterns. Exhaustive training is well-known in the art. In this case, M transmit spatial patterns are transmitted by the transmitter and N received spatial patterns are received by the receiver to form an N by M channel matrix. Thus, the transmitter goes through a pattern of transmit sectors and the receiver searches to find the strongest signal for that transmission. Then the transmitter moves to the next sector. At the end of the exhaustive search process, a ranking of all the positions of the transmitter and the receiver and the signals strengths of the channel at those positions has been obtained. The information is maintained as pairs of positions of where the antennas are pointed and signal strengths of the channels. The list may be used to steer the antenna beam in case of interference.

In an alternative embodiment, bi-section training is used in which the space is divided in successively narrow sections with orthogonal antenna patterns being sent to obtain a channel profile.

Assuming DSP 101 is in a stable state and the direction the antenna should point is already determined. In the nominal state, the DSP will have a set of coefficients that it sends the phase shifters. The coefficients indicate the amount of phase the phase shifter is to shift the signal for its corresponding antennas. For example, DSP 101 sends a set digital control information to the phase shifters that indicate the different phase shifters are to shift different amounts, e.g., shift 30 degrees, shift 45 degrees, shift 90 degrees, shift 180 degrees, etc. Thus, the signal that goes to that antenna element will be shifted by a certain number of degrees of phase. The end result of shifting, for example, 16, 34, 32, 64 elements in the array by different amounts enables the antenna to be steered in a direction that provides the most sensitive reception location for the receiving antenna. That is, the composite set of shifts over the entire antenna array provides the ability to stir where the most sensitive point of the antenna is pointing over the hemisphere.

Note that in one embodiment the appropriate connection between the transmitter and the receiver may not be a direct path from the transmitter to the receiver. For example, the most appropriate path may be to bounce off the ceiling.

The Back Channel

In one embodiment, the wireless communication system includes a back channel, or link, for transmitting information between wireless communication devices (e.g., a transmitter and receiver, a pair of transceivers, etc.). The information is related to the beamforming antennas and enables one or both of the wireless communication devices to adapt the array of antenna elements to better direct the antenna elements of a transmitter to the antenna elements of the receiving device together. The information also includes information to facilitate the use of the content being wirelessly transferred between the antenna elements of the transmitter and the receiver.

In FIG. 2, back channel 220 is coupled between DSP 216 and DSP 201 to enable DSP 216 to send tracking and control information to DSP 201. In one embodiment, back channel 220 functions as a high speed downlink and an acknowledgement channel.

In one embodiment, the back channel is also used to transfer information corresponding to the application for which the wireless communication is occurring (e.g., wireless video). Such information includes content protection information. For example, in one embodiment, the back channel is used to transfer encryption information (e.g., encryption keys and acknowledgements of encryption keys) when the transceivers are transferring HDMI data. In such a case, the back channel is used for content protection communications.

More specifically, in HDMI, encryption is used to validate that the data sink is a permitted device (e.g., a permitted display). There is a continuous stream of new encryption keys that is transferred while transferring the HDMI datastream to validate that the permitted device has not been changed. Blocks of frames for the HD TV data are encrypted with different keys and then those keys have to be acknowledged back on back channel 220 in order to validate the player. Back channel 220 transfers the encryption keys in the forward direction to the receiver and acknowledgements of key receipts from the receiver in the return direction. Thus, encrypted information is sent in both directions.

The use of the back channel for content protection communications is beneficial because it avoids having to complete a lengthy retraining process when such communications are sent along with content. For example, if a key from a transmitter is sent alongside the content flowing across the primary link and that primary link breaks, it will force a lengthy retrain of 2-3 seconds for a typical HDMI/HDCP system. In one embodiment, this separate bi-directional link that has higher reliability than the primary directional link given its omni-directional orientation. By using this back channel for communication of the HDCP keys and the appropriate acknowledgement back from the receiving device, the time consuming retraining can be avoided even in the event of the most impactful obstruction.

During the active period when the beamforming antennas are transferring content, the back channel is used to allow the receiver to notify the transmitter about the status of the channel. For example, while the channel between the beamforming antennas is of sufficient quality, the receiver sends information over the back channel to indicate that the channel is acceptable. The back channel may also be used by the receiver to send the transmitter quantifiable information indicating the quality of the channel being used. If some form of interference (e.g., an obstruction) occurs that degrades the quality of the channel below an acceptable level or prevents transmissions completely between the beamforming antennas, the receiver can indicate that the channel is no longer acceptable and/or can request a change in the channel over the back channel. The receiver may request a change to the next channel in a predetermined set of channels or may specify a specific channel for the transmitter to use.

In one embodiment, the back channel is bi-directional. In such a case, in one embodiment, the transmitter uses the back channel to send information to the receiver. Such information may include information that instructs the receiver to position its antenna elements at different fixed locations that the transmitter would scan during initialization. The transmitter may specify this by specifically designating the location or by indicating that the receiver should proceed to the next location designated in a predetermined order or list through which both the transmitter and receiver are proceeding.

In one embodiment, the back channel is used by either or both of the transmitter and the receiver to notify the other of specific antenna characterization information. For example, the antenna characterization information may specify that the antenna is capable of a resolution down to 6 degrees of radius and that the antenna has a certain number of elements (e.g., 32 elements, 64 elements, etc.).

In one embodiment, communication on the back channel is performed wirelessly by using interface units. Any form of wireless communication may be used. In one embodiment, OFDM is used to transfer information over the back channel. In another embodiment, continuous-phase modulation (CPM) with low peak-to-average power ratio is used to transfer information over the back channel.

Physical Layer (PHY) Overview

Wireless HD specification supports two basic types of PHY: high rate PHY (HRP) and low rate PHY (LRP).

In accordance with one embodiment, HRP supports multi-Gbps data rates. HRP may operate in a directional mode (typically beam-formed mode). HRP may be used to transmit audio, video, data, and control messages. LRP can only be sent from HTx/HTR devices to HRx/HTR devices. In one embodiment, HRP occupies roughly 1.7 GHz bandwidth.

In accordance with one embodiment, LRP supports multi-Mbps data rates. LRP may operate in a directional, omni-directional, or beam-formed modes. In one embodiment, LRP may be used to transmit control messages, beacons, and acknowledgements. In an alternative embodiment, LRP may further be used to transmit audio or compressed video. In yet another embodiment, LRP may further be used to transmit low-speed data. LRP can be sent between any devices. LRP occupies one of three 91 MHz sub-channels within HRP channel as discussed below.

Frequency Planning

Figure 4:
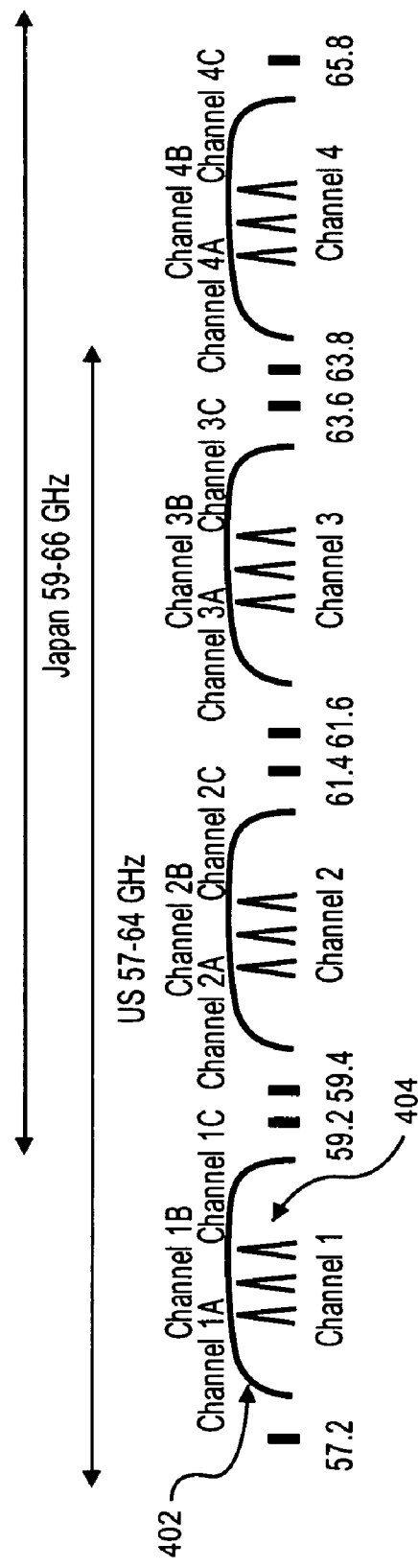
FIG. 4 is a block diagram of one embodiment of different channels sharing frequencies.

HRP and LRP may share the same frequency band. FIG. 4 illustrates one embodiment of frequency planning for HRP and LRP. The low-rate channels 404 share the same frequency band as the corresponding high-rate channels 402. Three low-rate channels 1A, 1B, 1C may be allocated within each high-rate channel bandwidth (channel 1) to avoid interference. In accordance with another embodiment, the low-rate and high-rate channels may operate in time-division duplex mode. FIG. 4 illustrates an example of four channels between 57 GHz to 66 GHz: channel 1 operating between 57.2 GHz and 59.2 GHz, channel 2 operating between 59.4 GHz and 61.4 GHz, channel 3 operating between 61.6 GHz and 63.6 GHz, channel 4 operating between 63.8 GHz and 65.8 GHz.

A single low-cost crystal oscillator may be able to generate those frequencies. The baseband clock frequency may be near 2.5 GHz (e.g. 2.508 GHz). In accordance with one embodiment, the frequency planning may support implementation-friendly RF Synthesizer design. The resultant center frequencies may be: 58.608 GHz, 60.720 GHz, 62.832 GHz, and 64.944 GHz. Possible crystal frequencies may include 44 MHz, 66 MHz, and 132 MHz.

High-Rate PHY (HRP)

HRP may support data rates of 3.76 Gbps, 1.88 Gbps, 0.94 Gbps. The data rates may individually correspond to video resolution standard of 1080p, 1080i, 480p for various sampling rates depending on needs. As a result, the range may be increased at lower data rates. Higher PHY rates may still allow for multiple lower-rate streams via MAC.

HRP may utilize several types of coding and modulation: OFDM, 16QAM and QPSK modulations, inner convolutional code (rate of 1/3, 2/3, 4/7, 4/5), and outer Reed-Solomon rate 0.96 code. The use of Reed-Solomon outer code in addition to the inner convolution code reduces SNR requirements by about 2 dB. An outer interleaver may be used to realize full gains of the outer code.

HRP may utilize four channels across the global 60 GHz band for an active channel bandwidth of 1.7 GHz. In accordance with one embodiment, there may be three channels per region.

HRP may be scalable to include parallelization of FEC stream for cost-effective implementation and supports of UEP concepts.

Figure 5A:
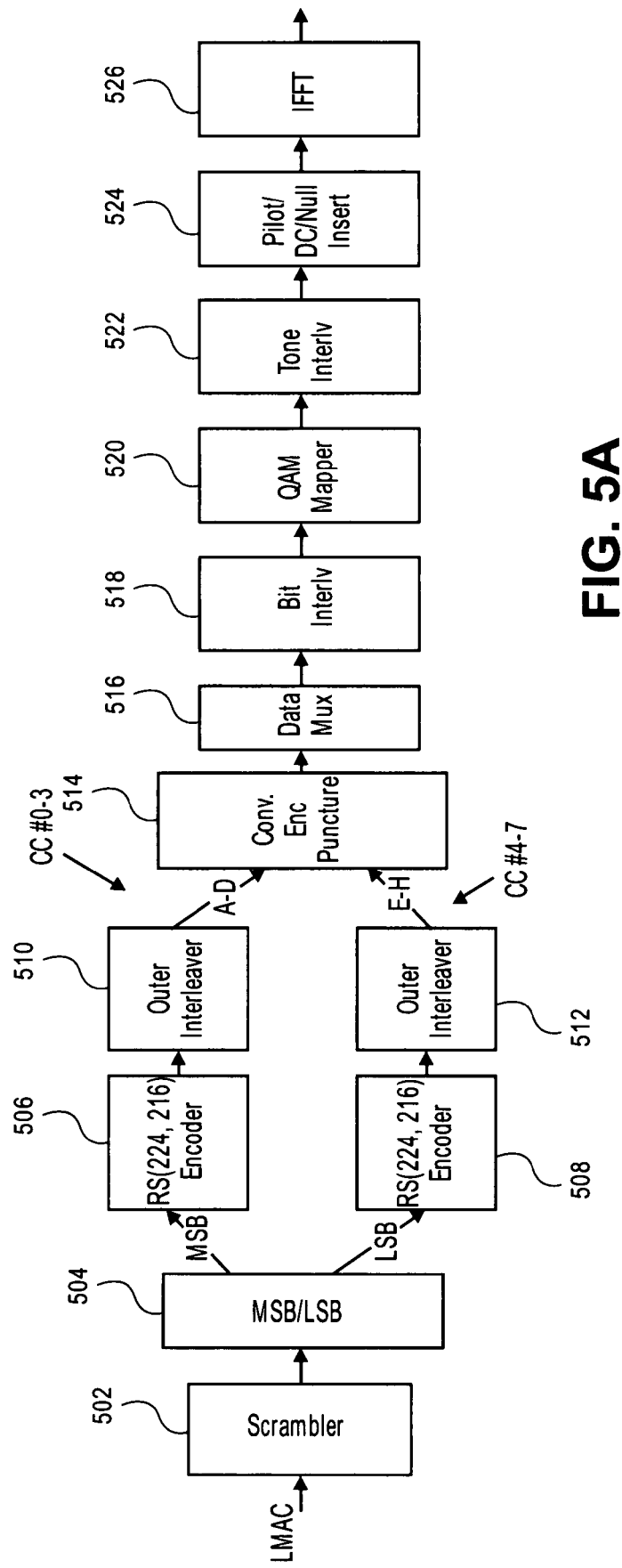
FIG. 5A is a block diagram of one embodiment of a physical layer for the wireless HD communication system of FIG. 1.

FIG. 5A illustrates one embodiment of a Tx PHY block diagram. A scrambler 502 receives LMAC data and feeds into MSB/LSB separation block 504. For MSB, RS encoder 506 and outer interleaver 510 may be used. For LSB, RS encoder 508 and outer interleaver 512 may be used. A puncture circuit 514 may be coupled to outer interleavers 510 and 512. The following circuits form the sequence following the puncture circuit 514: data mux 516, bit interleaver 518, QAM mapper 520, tone interleaver 522, pilot/DC/null insert 524, and 1526.

HRP Outer interleavers 510, 512 may include a block interleaver and a convolutional interleaver. The function of the outer interleaver is to ensure that each byte of the outer code is mapped to consecutive bits for the inner code codeword and consecutive bytes of the outer code is mapped to different inner code codeword. The block interleaver requires almost no memory in the transmitter and may improve efficiency without zero insertion. Tail bits may be easy to add by the outer interleaver. The convolutional interleaver requires several shift registers in the transmitter and may degrade efficiency with zero insertion. When convolutional interleaver is used, four OFDM symbols may be needed to transmit the initial/final zeros in the shift registers. The efficiency may degrade from about 0.5% to about 2%. The block outer interleaver 510, 512 can minimize the memory requirement between the outer Reed-Solomon code and inner convolutional codes. In one embodiment, the block interleaver has a depth of 4 and there are M=4 inner convolutional encoders for each outer interleaver. The outer block interleaver shall be operated with a depth of four for HRP data. In one embodiment, the block interleaver may be implemented by a table of octets with the number of columns the same as the depth and the number of rows the same as the length of the Reed-Solomon code as:

$$b(i,k), i=0, 1, \ldots, \text{depth}-1; k=0, 1, \ldots, N-1$$

The octets of b(i,K), b(i,K+1), ..., b(i,N−1) are the Reed-Solomon code parity of the octets of b(i,0), b(i,1), ..., b(i,K−1), where RS(N,K) is the Reed-Solomon code. In one embodiment, the parameters for the outer interleaver are depth=4, K=216 and N=224. In another embodiment, the block interleaver is operated on group of bits, called bytes. In another embodiment, each byte has 8 bits or one octet. In another embodiment, each byte has more than 1 bit.

Figure 5B:
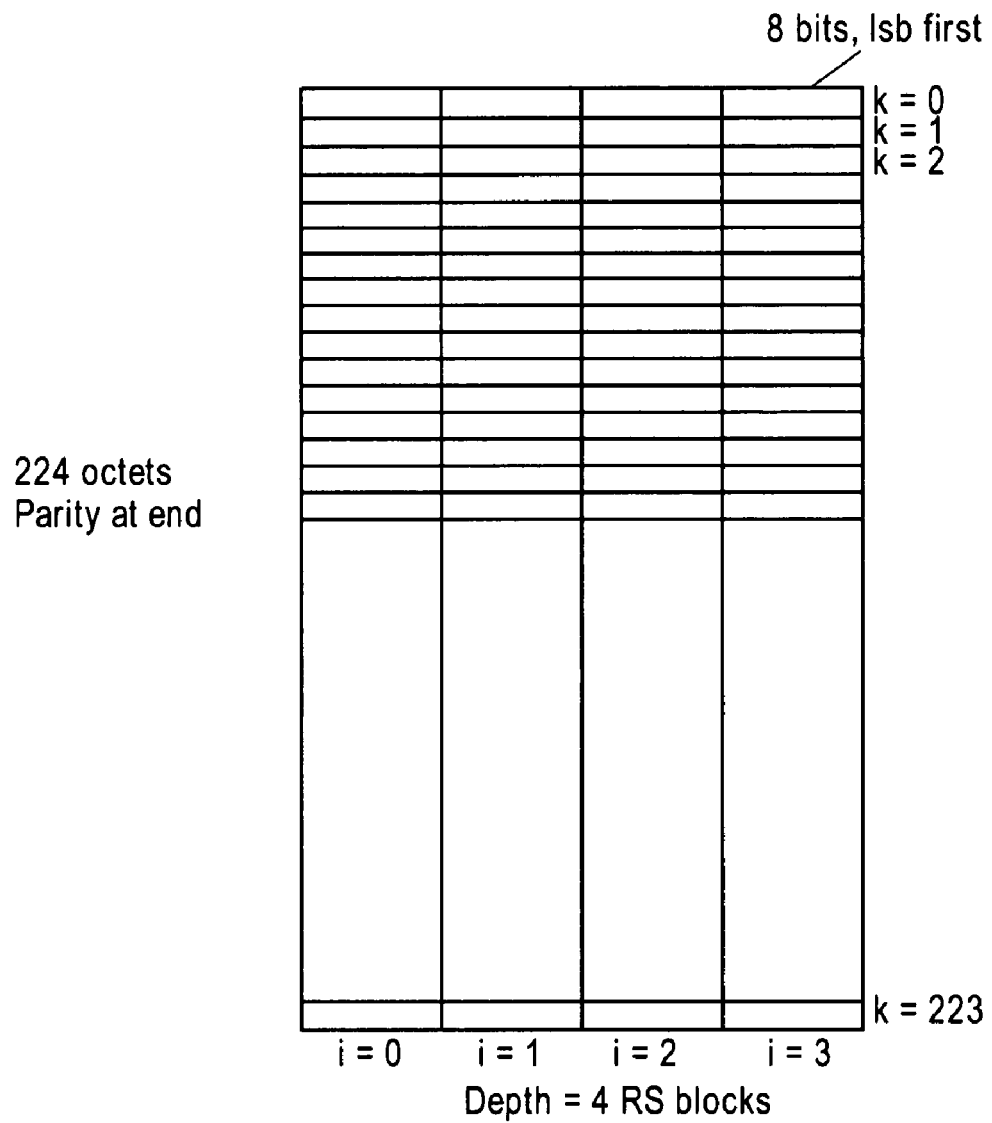
FIG. 5B is a table illustrating one example of a block interleaver code.

FIG. 5B illustrates one example of a block interleaver code. To reduce the memory requirement, the mapping to the columns and rows of FIG. 5B uses following formulas:

$$i = \text{floor}\{[l \bmod (\text{depth}*M)]/M\}$$

$$k = M \text{ floor}[l/(\text{depth}*M)] + l \bmod M$$

$$l = 0, 1, \ldots, \text{depth}*K-1$$

where l is the octet number at the input to the outer interleaver.

The outer interleaver may output the octets from i=0, k=0 first to i=depth−1, k=N−1 last. With M parallel convolutional inner encoders for each RS codeword, the outer interleaver shall give the octets of b(0,0), ..., b(depth−1,0) to the first convolutional encoder with LSB first. All octets of b(i,k*M+ m), i=0, . . . , depth−1, k=0, 1, . . . , N/M−1, shall be output to the $m^{th}$ convolutional encoder. The tail bit for convolutional encoder is inserted by the outer interleaver. The i=depth−1 column of FIG. 5B is a shortened RS(N−M, K−M, t=4) code with parity bytes located at b(depth−1, K−M−9), b(depth−1, K−M−8), . . . , b(depth−1, K−M−1). The bytes of b(depth−1, N−M), . . . , b(depth−1, N−1) are padded with zeroes.

FIG. 6 illustrates various parameters of HRP in three different tables (602, 604, 606). Tables 602 and 604 illustrate different parameters of HRP in accordance with one embodiment. Table 606 illustrates supported rates in different modes of HRP.

Figure 7:
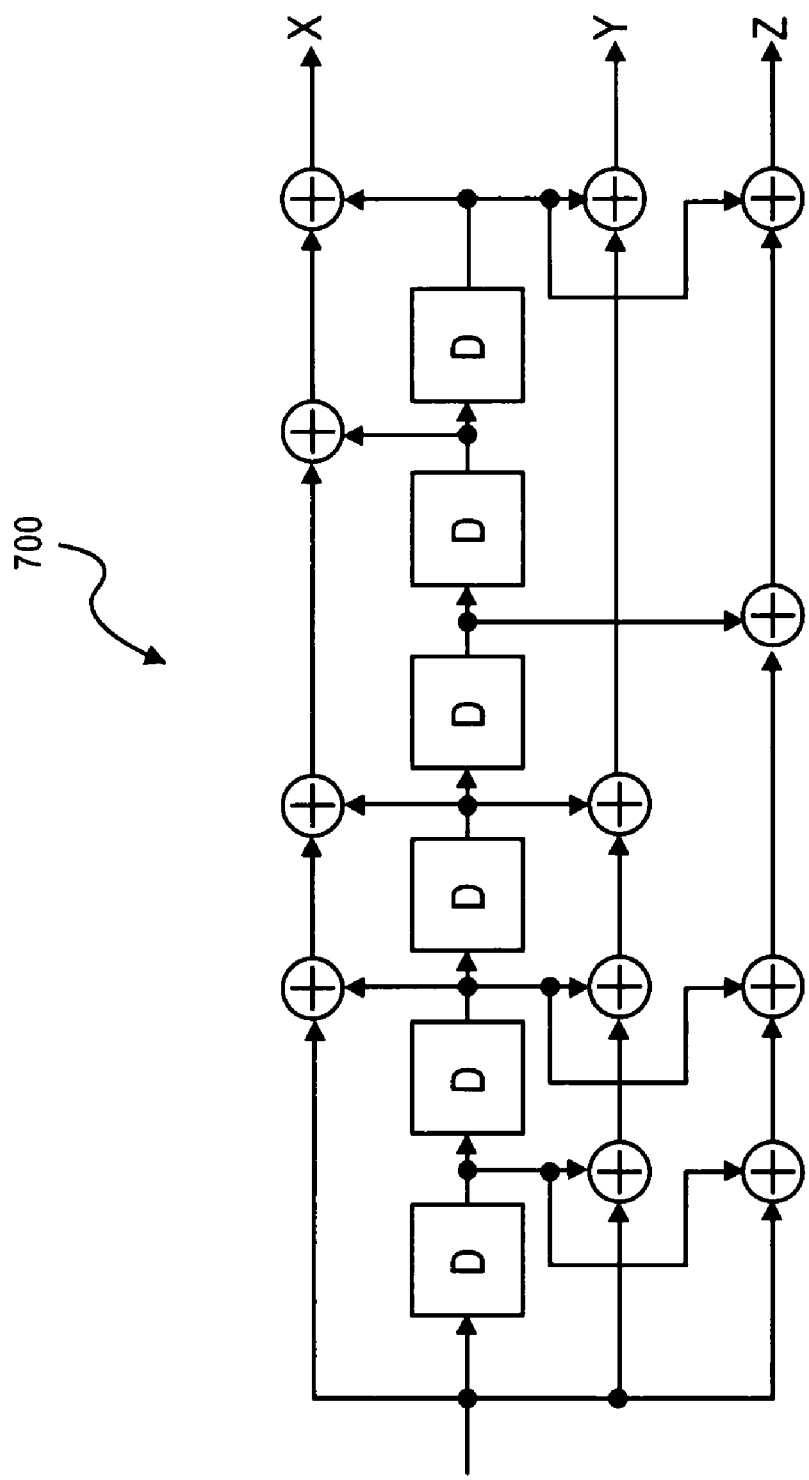
FIG. 7 is a block diagram of one embodiment of an inner code circuit of the wireless HD communication system of FIG. 1.
Figure 8:
FIG. 8 is a table of inner code rate of the inner code circuit of FIG. 7.

One embodiment of the HRP inner code circuit is illustrated in FIGS. 7 and 8. FIG. 7 illustrates a circuit diagram 700 of an HRP inner code. The inner code circuit may be described using the polynomial of (133, 171, 165). FIG. 8 illustrates a table of code rates, puncturing pattern, and transmitted sequence of the HRP inner code circuit. A "0" in the puncturing pattern means puncture or delete and an "1" in the puncturing pattern means non-puncture or not deleted.

In order to support 3.9 Gbps data rate, convolutional encoder parallelism may be needed. In one embodiment, radix-4 accumulated-compared-selected (ACS) technique may be used at the receiver. Radix-4 ACS processes 2 bits per cycle. The required clock frequency is equal to 3.9 Gbps divided by the number of decoders and divided two. For example, for 8 decoders, a 244 MHz clock may be required.

HRP Data Multiplixer 516 may combine the data from 8 convolutional encoders. Its mode may depend on EEP or UEP. In EEP mode, a round robin scheme is implemented to distribute the bits evenly. In UEP modulation mode, MSB corresponds to I branch of the QAM mapper, and LSB corresponds to the Q branch of the QAM mapper. In UEP coding mode, a strong MSB convolutional code results in more MSB bits than LSB bits at the input of the data multiplexer 516. A block of 4 input bits for each of 8 convolutional encoders (total 32) may represent one full cycle of puncture pattern. The UEP coding mode may result in 28 MSB bits with 20 LSB bits at the convolutional encoder output that are mapped to 48 transmitted bits spread over I and Q.

HRP Bit Interleaver 518 may spread bits from HRP Data Multiplexer 516 to the I/Q-branches of the QAM or QPSK constellations. MSB and LSB of QAM constellation do not provide the same coded BER. The bit interleaver may ensure the same BER for each bit stream from the same inner code encoder. Each bit stream maps to equal number of MSB and LSB of QAM constellation. One proposed solution is the following:
P16: 0, 1, 2, 3, 4, 5, 6, 7, 9, 8, 11, 10, 13, 12, 15, 14 with $$i=M*\text{floor}(k/M)+\text{mod}(2*\text{floor}(k/2)+\text{mod}(k+\text{floor}(k/M),2),M), k=0, 1, \ldots, 2M-1$$

where i is the index of output bits and k is the index of input bits in a block of 2M=16.
P32: 0, 1, 2, 3, 4, 5, 6, 7, 11, 8, 9, 10, 15, 12, 13, 14, 18, 19, 16, 17, 22, 23, 20, 21, 25, 26, 27, 24, 29, 30, 31, 28 with $$i=M*\text{floor}(k/M)+\text{mod}(4*\text{floor}(k/4)+\text{mod}(k+\text{floor}(k/M),4),M), k=0, 1, \ldots, 4M-1$$

where i is the index of output bits and k is the index of input bits in a block of 4M=32.

Figure 9:
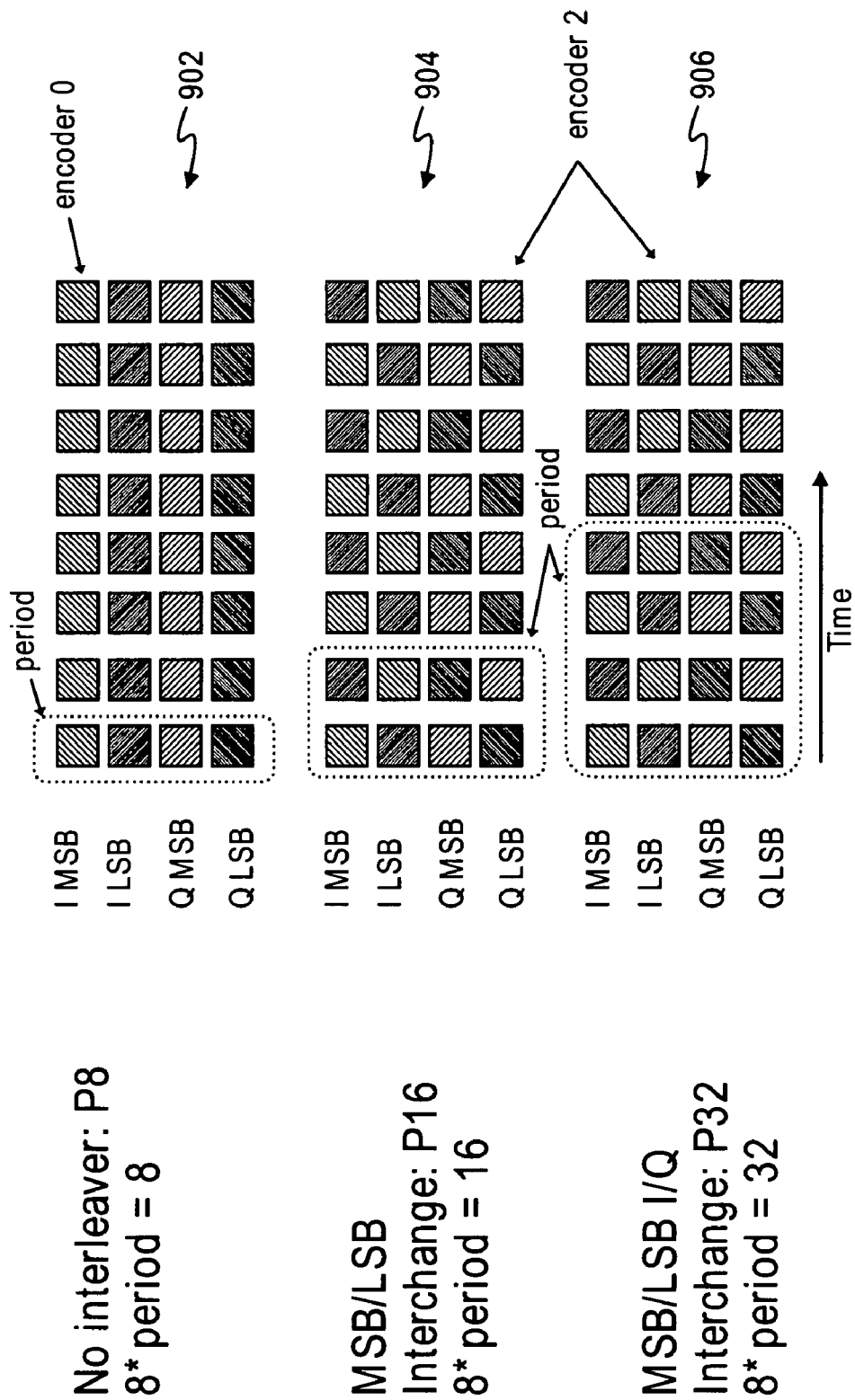
FIG. 9 is a block diagram of one embodiment of a bit interleaver of the wireless HD communication system of FIG. 1
Figure 10:
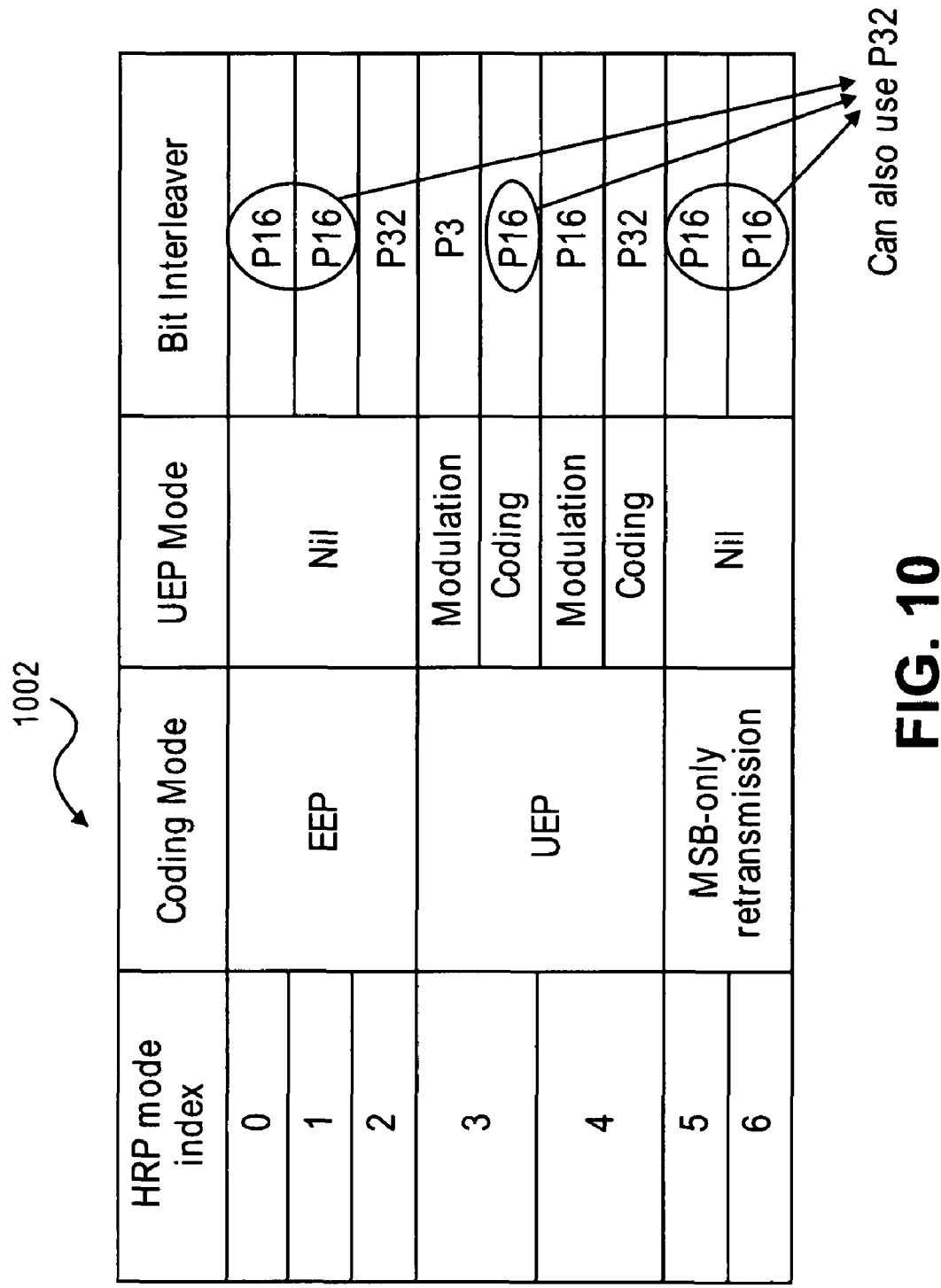
FIG. 10 is a table of specification of the bit interleaver of FIG. 9.

The above solution is graphically illustrated in FIGS. 9 and 10.

In the HRP channel with frequency selective fading, different subchannels of a OFDM symbol may have different channel response and adjacent OFDM subchannels are typically experience with the same fading effect. To improve performance, a tone interleaver maps adjacent data to far away OFDM subchannels. In one embodiment, HRP Helical Scan Tone Interleaver may include the following solution:

$$i=\text{mod}(\text{floor}(k/24)+3*\text{mod}(k,24),14)*24+\text{mod}(k,24),$$
$$k=0, 0, \ldots, N_{dsc(HR)}-1$$

where i is the index of output tones and k is the index of input tones.

Figure 11:
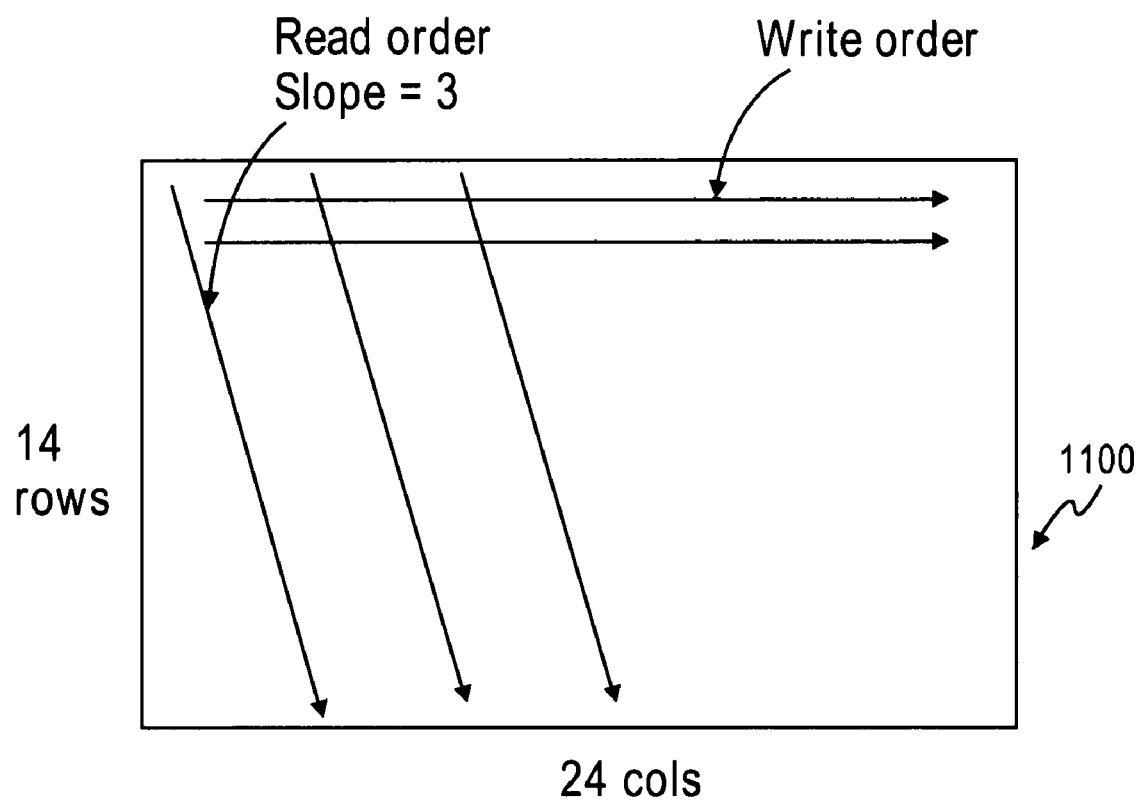
FIG. 11 is a graph diagram of one embodiment of a tone interleaver of the wireless HD communication system of FIG. 1.

The above solution is graphically illustrated in FIG. 11.

In an alternative embodiment, the tone interleaver may be designed based on the bit-reversal principle. In practical implementation of IFFT, there is a bit reversal circuit either before or after the IFFT calculations. In the bit-reversal circuits, the index of the input data is first represented as binary number, the resulted binary representation is bit reversed, and the bit reversed binary number becomes the index of the output data. When the bit-reversal tone interleaver is used, the tone interleaver and the IFFT calculations can be combined. The IFFT calculation circuit embedded the bit-reversal tone interleaver. DC, null, and pilot tones shall be inserted in the bit-reversal position before the tone interleaver. This makes sure that after permutation, the DC, null and pilot tones will appear in the pre-specified positions. With traveling pilot as described later, the bit-reversal position for the pilot changes from OFDM symbol to symbol. The bit-reversal tone interleaver may be operated the best for radix-2 IFFT implementation that uses many 2 by 2 fundamental building blocks. As an example, for radix-8 IFFT implementation that uses many 8 by 8 building blocks, the index of the input data should be first represented as an octal number, the octal-reversal number is the output data. In this specific example, the octal-reversal tone interleaver provides the simplest implementation for the combined tone interleaver and IFFT.

HRP Pilot 524 may include a rotating pilot scheme to vary pilot carriers per symbol to allow better channel tracking over the packet if desired. This also avoids having to change the polarity of all pilots from one OFDM symbol to the next OFDM symbol, according to a cover sequence. Pilot values may be the same as in the corresponding tones of HRP preamble #5 described later. The pilot tone locations may be defined with a symbol index start at Preamble #5. For symbol=0:Nsymbol−1, k=(−177+mod(3*symbol, 22):22:177) where k!={−1,0,1}. In accordance with one embodiment, the pilot rotation speed may be fixed so as to rotate 3 bins per symbol. In contrast, if the pilot locations were fixed, their values would need to be changed over time to avoid any spectrum ripples effect.

HRP Preamble may include 8 symbols. Symbols #1-#4 may be based on PN sequence. 6 consecutive m-sequences may be used in 4 symbols. Symbols #1-#4 may be used for packet detection, frame synchronization and AGC training. Symbols #5-#8 may be based on OFDM symbols and may be used for frequency offset estimation and channel estimation. In accordance with one embodiment, a scale factor correction may be used to keep power of 8 preamble symbols the same as the remaining OFDM symbols for data transmission. In one of the embodiment, the power of the symbols #1-#4 may be 3 dB larger than symbols #5-#8.

Figure 12:
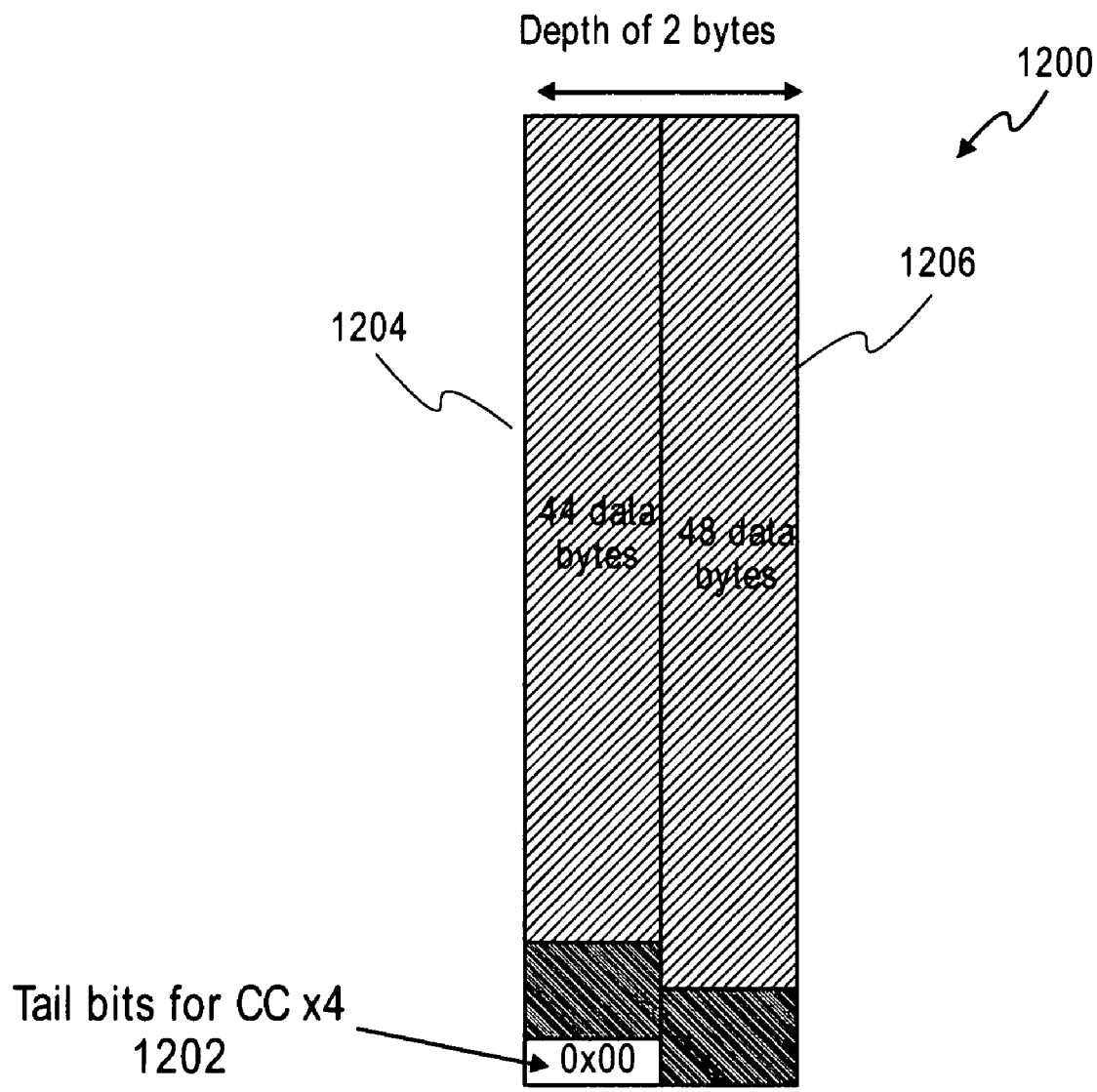
FIG. 12 is a block diagram of one embodiment of a high rate packet (HRP) header outer FEC of the wireless HD communication system of FIG. 1.

FIG. 12 illustrates one embodiment of outer FEC for HRP Header. HRP Header outer FEC is somewhat similar to the outer FEC for HRP data in that it provides the same or better error protection as the data. It uses the same Reed-Solomon generator. It uses the same method to provide tail bits to terminate convolutional codewords. It uses the same Reed-Solomon decoder in the receiver. Four OFDM symbols may be used for HRP header in quarter rate with 112 coded bytes. HRP Header FEC may use the same RS code generator polynomial as the data. The HRP Header FEC may include 92 or more uncoded bytes. One coding branch may include 4 convolutional encoders having 4 tail bytes 1202. The depth of the HRP Header FEC may be 2 bytes 1204 and 1206. Bytes 1204 may include 44 data bytes, 8 parity bytes, and tail bits 1202. Bytes 1206 may include 48 data bytes, 8 parity bytes. The depth of 2 block interleaver may provide sufficient performance.

Figure 13:
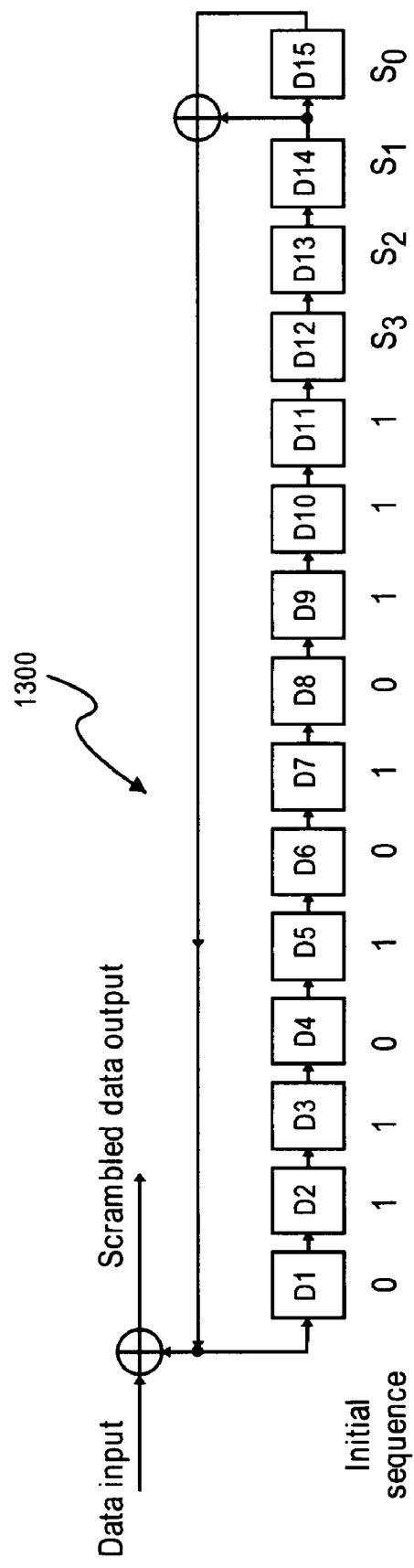
FIG. 13 is a block diagram of one embodiment of a high rate packet (HRP) data scrambler of the wireless HD communication system of FIG. 1.

FIG. 13 illustrates one embodiment of a HRP data scrambler. A polynomial of degree 15 may be used ($x^{15}+x^{14}+1$) to improve randomness of the transmitted data for HRP. FIG. 13 illustrates an initialization sequence with four bits at positions D12 to D15 (with D15 first).

Low-Rate PHY (LRP)

LRP may be used for MAC frame transmission (e.g., ACKs, beacons, discovery, etc. . . . ), for low rate (less than 40 Mbps) streaming from A/V source, for transmission of data used for antenna steering and tracking. LRP may be designed with OFDM based on 128-point FFT with BPSK modulation, and convolutional coding at 1/3, 1/2, and 2/3 rate. No Reed-Solomon code may be required due to messages being shorter and a higher BER tolerance. LRP may operate in three modes: LRP Omnidirectional (long) mode, LRP Beam-formed mode, and LRP Directional (short) mode. The different modes are further discussed below.

Figure 14:
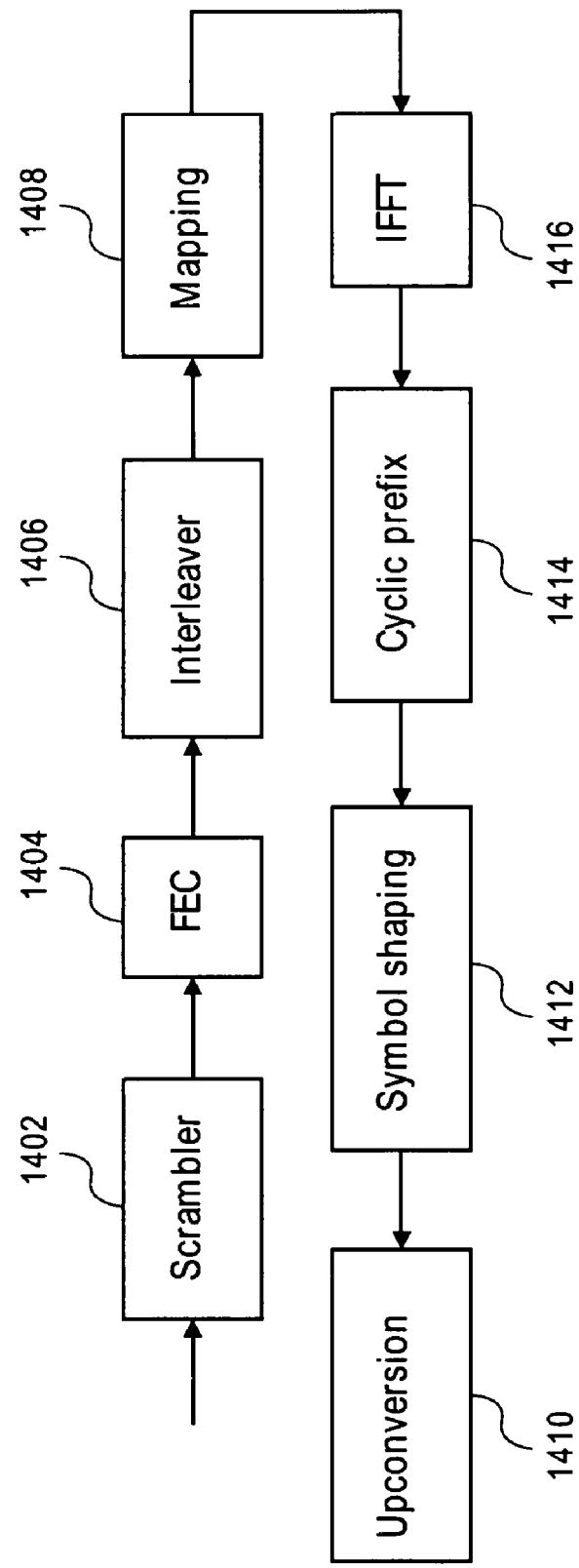
FIG. 14 is a block diagram of one embodiment of a physical layer of a low rate packet (LRP) transmission of the wireless HD communication system of FIG. 1.

FIG. 14 illustrates one implementation of a LRP Tx processing. The LRP circuit may include Scrambler 1402, FEC 1404, Interleaver 1406, Mapping 1408, IFFT 1416, Cyclic prefix 1414, Symbol shaping 1412, and Upconversion 1410.

FIG. 15 illustrates a table of LRP Data Rates. As shown, the different LRP modes produce different LRP data rates.

LRP Pilot and Data Tone may be defined as follows: 128-point FFT, 30 Data tones and 4 pilot tones, three unused tones at DC (tone numbers −1, 0, and 1), pilot tone positions may be modified, fixed pilot tone positions at tone numbers −14, −6, 6, and 14, data tones at all other positions from −18 to +18.

LRP Scrambler 1402 may use a polynomial of degree 6. The scrambler initialization field may be 4 bits. To initialize this polynomial, the 4 bit initialization field may be concatenated with 01 bits.

In LRP Omnidirectional mode, the produced signal is omnidirectional, has at least as much range as any forward-channel mode, tolerates stronger multipath than forward channel. The line rates in the LRP Omnidirectional mode may be from about 5 to about 10 Mbps, with a target BER less than $10^{-6}$. In LRP omnidirectional mode, each signal is transmitted multiple times using different antenna patterns. In one embodiment, each signal is repeated 8 times using 8 different antenna patterns. In one embodiment, different antenna patterns are orthogonal with each other. Thus, each replication uses a different TX phase array setting (switched during cyclic prefix). The receiver can combine replications using MRC or similar techniques. Spatial diversity helps maintain omni coverage.

Figure 16:
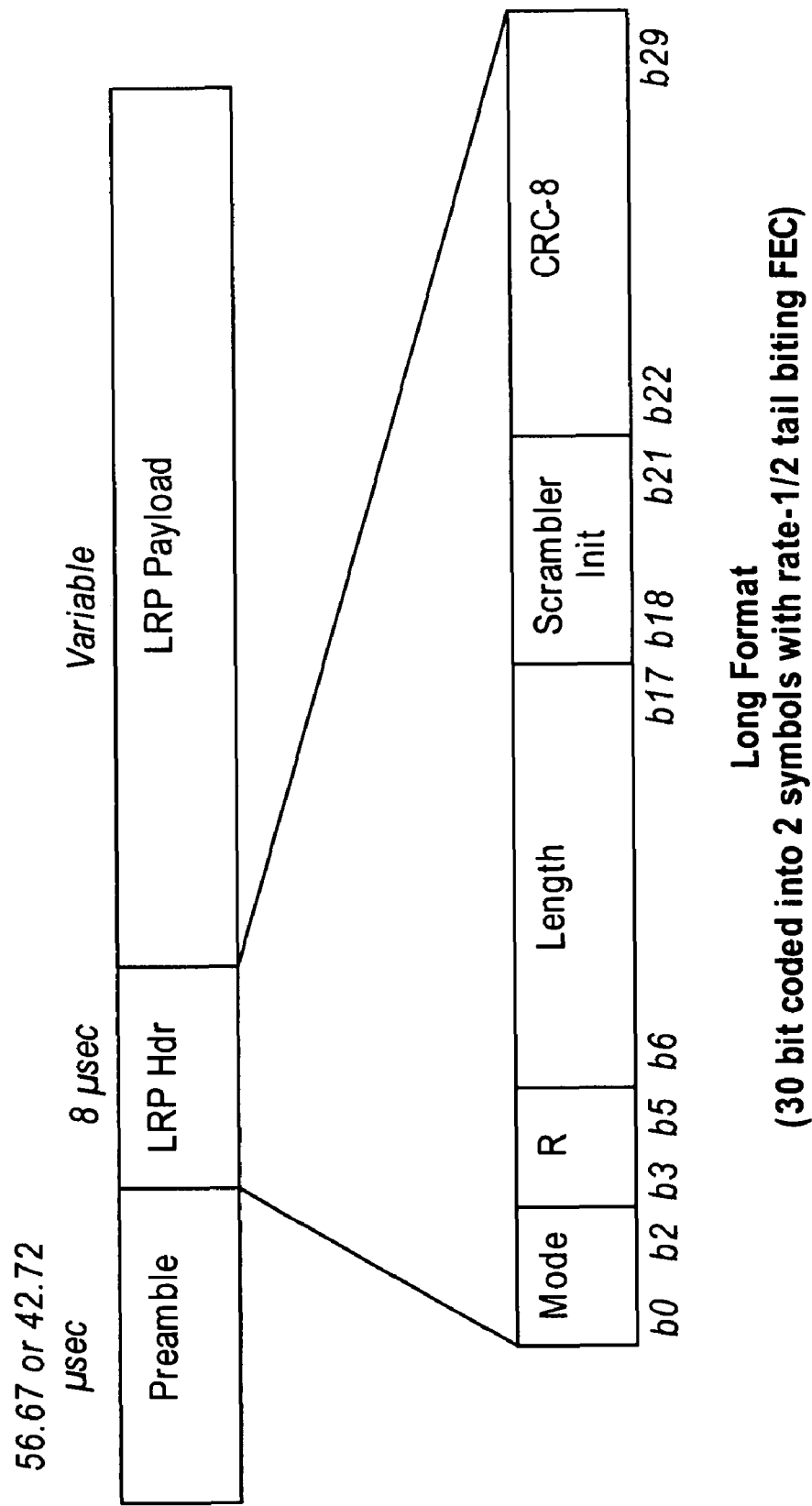
FIG. 16 is a block diagram of one embodiment of a format for an omnidirectional low rate packet (LRP) data packet.

FIG. 16 illustrates an LRP Omni data packet format comprising: preamble 1602, header 1604, payload 1606. Header 1604 may comprise mode 1608, Reserved 1610, Length 1612, Scrambler Init 1614, and CRC-8. Header 1604 is a long format with 30 bit coded into 2 OFDM symbols with rate 1/2 tail biting convolutional code. When tail biting is used, the initial and final states of the convolutional code are the same. In one embodiment, the last six information bits of the header may be used to initialize the state of the convolutional encoder. LRP Omni Preamble 1602 may include two types: a long omni preamble and a short omni preamble.

The Long Omni Preamble may be about 56.67 μsec long. This type of preamble may be used for beacons and other LRP data packets that require blind timing synchronization.

Figure 17:
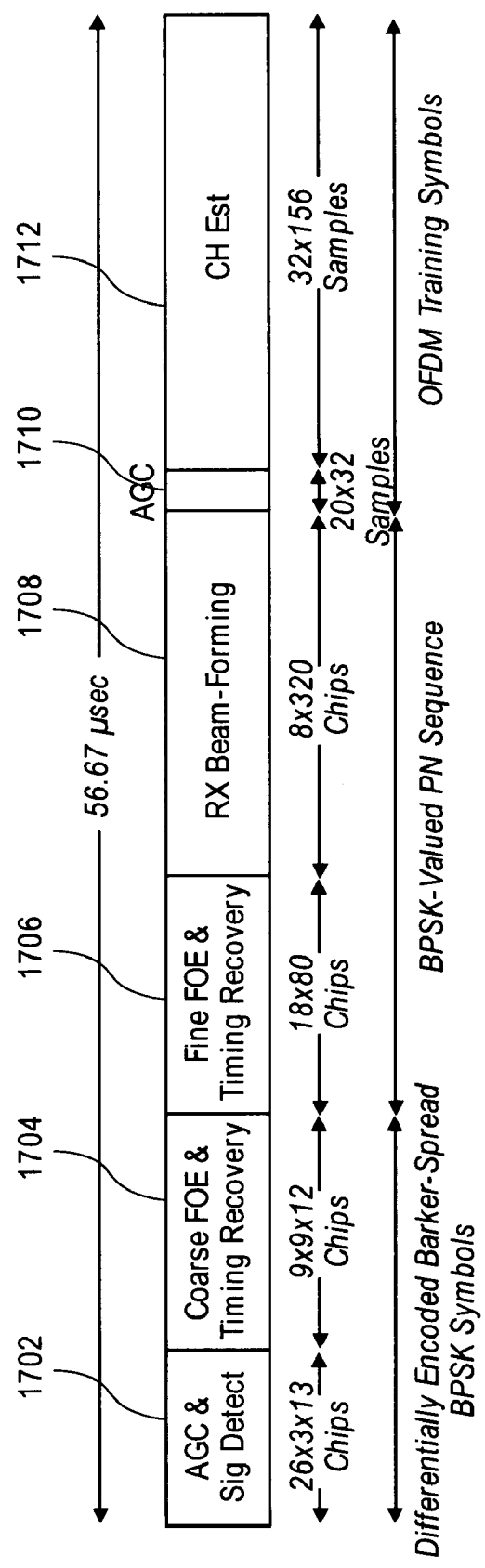
FIG. 17 is a block diagram of one embodiment of a long preamble format for an omnidirectional low rate packet (LRP) data packet.

FIG. 17 illustrates one embodiment of a Long Omni Preamble 1700 having 6 segments (with 17766 samples): automatic gain control (AGC) and signal detection segment 1702, coarse frequency offset estimation (FOE) & timing recovery segment 1704, fine FOE & timing recovery segment 1706, RX beam-forming segment 1708, AGC segment 1710, and Channel Estimation segment 1710. The first three preamble segments 1702, 1704, 1706 consist of sequences of Offset-QPSK modulated chips with chip rate of 156.75 MHz (one-half of the sampling rate), which are filtered to comply with 91 MHz LRP transmission mask.

The AGC and Signal Detect segment 1702 field is composed of 78 symbols, with each symbol being defined as a 1 or −1 being spread by the Barker-13 ([−1 −1 −1 −1 −1 1 1 −1 −1 1 −1 1 −1]) chip sequence for both I and Q components. The symbol sequence $\{S_k\}$, $S_k=\mp 1$, is constructed by differential encoding of 26 times repetition of the 3-symbol sequence $\{b_k\}=[-1, 1, -1]$, specifically $S_k=S_{k-1}\times b_k$ with $S_0=1$.

The Coarse FOE (Frequency Offset Estimation) segment 1704 field is composed of 81 symbols, with each symbol being defined as a 1 or −1 being spread by the Barker-13 chip sequence for both I and Q components. The symbol sequence $\{S_k\}$, $S_k=\mp 1$, is constructed by differential encoding of 9 times repetition of the 9-symbol sequence $\{b_k\}=[-1 -1 -1 -1 1 1 -1 1 -1]$, specifically $S_{9i+k}=S_{9i+k-1}\times b_k$, where $S_0$ is the last symbol of the previous field Fine FOE & Timing Recovery segment 1706 field consists of a 1440 PN chip sequence used for both I and Q components, which is generated by using polynomial $x^{12}+x^{11}+x^8+x^6+1$ with initial condition 0xB95.

RX Beam-forming segment 1708 field consists of a 2560 PN chip sequence used for both I and Q components, which is constructed by repeating the 63-tap M-sequence generated by the polynomial $x^6+x^5+1$ with initial condition 101001.

AGC segment 1710 is a 20 times repetition of a 32-sample long OFDM training symbol, which is equal to IFFT of the following BPSK 32-point sequence: subcarriers −4 to 4 equal to {1 1 1 −1 0 −1 −1 1 −1} and all others are equal to zero.

Channel Estimation segment 1712 consists of 32 128-sample OFDM training symbols, where each is equal to IFFT of the following 128-point BPSK sequence preceded by a 28-sample cyclic prefix: subcarriers 2-18 equal to {1 −1 1 −1 −1 1 −1 1 1 1 1 1 1 −1 −1 1 1 1}, subcarriers −18 to −2 equal to {−1 1 1 1 1 1 −1 −1 1 1 −1 1 −1 −1 1 1 −1 1 1}, and all others are equal to zero. The TX antenna phase array pattern may change at regular intervals for each of the five fields in the LRP Omni Preamble 1602. So for 8 TX antennas, TX phase array changes every 78, 234, 160, 640, 64, and 156 samples for each of the above five fields respectively.

The Short Omni Preamble may be about 42.72 μsec long. This type of preamble may be used in contention period (for slotted CSMA), and other LRP data packets that require only limited (+/−135 nsec) timing synchronization.

Figure 18:
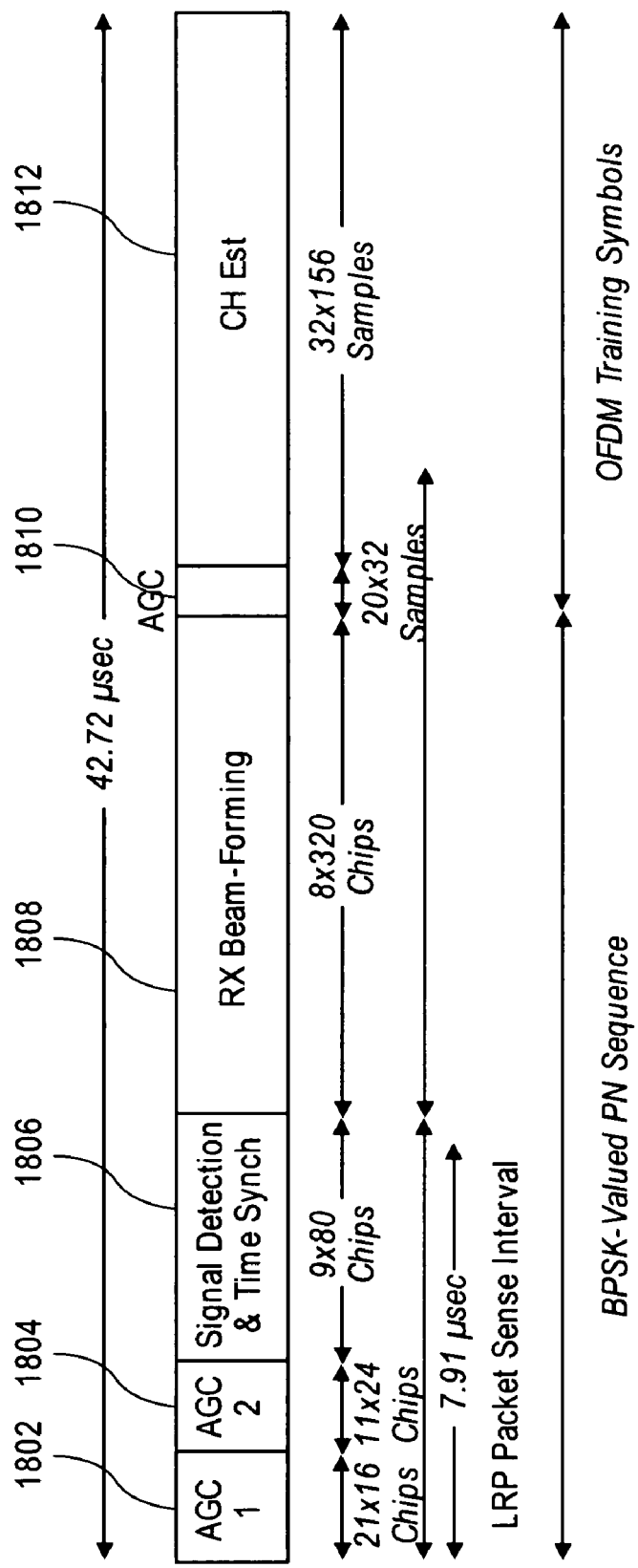
FIG. 18 is a block diagram of one embodiment of a short preamble format for an omnidirectional low rate packet (LRP) data packet.

FIG. 18 illustrates one embodiment of a short Omni Preamble 1800 having 6 segments (13392 samples): AGC segment 1802, AGC segment 1804, Signal Detection and Time Sync segment 1806, RX Beam-forming segment 1808, AGC segment 1810, and Channel Estimation segment 1812. The first four preamble fields 1802, 1804, 1806, 1808 consist of a sequence of BPSK chips with chip rate of 156.75 MHz (each chip is equal to 2 samples) that are filtered to comply with 91 MHz LRP transmission mask. The chip sequence is generated by repeating a 63-tap M-sequence to be specified. The first two fields 1802, 1804 are AGC fields, which are respectively 336 and 264 chips long. The third field 1806 is 720 chips long and is used to detect the LRP packet and synchronize its timing within a −/+135 nsec window. A fourth field 1808 is 2560 chips long and is used for RX beam-forming. The second AGC field 1804 is a 20 times repetition of a 32-sample long OFDM training symbol, which is equal to IFFT of following BPSK 32-point sequence: subcarriers −4 to 4 equal to {1 1 1 −1 0 −1 −1 1 −1}, and all others equal to zero. The Channel Estimation field 1812 consists of 32 128-sample OFDM training symbols, where each is equal to IFFT of the following 128-point BPSK sequence preceded by a 28-sample cyclic prefix: subcarriers 2-18 equal to {1 −1 1 −1 −1 1 −1 1 1 1 1 1 1 −1 −1 1 1}, subcarriers −18 to −2 equal to {−1 1 1 1 1 1 −1 −1 1 −1 1 −1 −1 −1 −1 1 −1 1 1}, and all others equal to zero. The TX antenna phase array pattern changes at regular intervals for each of the 6 fields in Short Omni Preamble. So for 8 TX antennas, TX phase array changes every 32, 48, 160, 640, 64, and 156 samples for each of the above 6 fields respectively.

Figure 19:
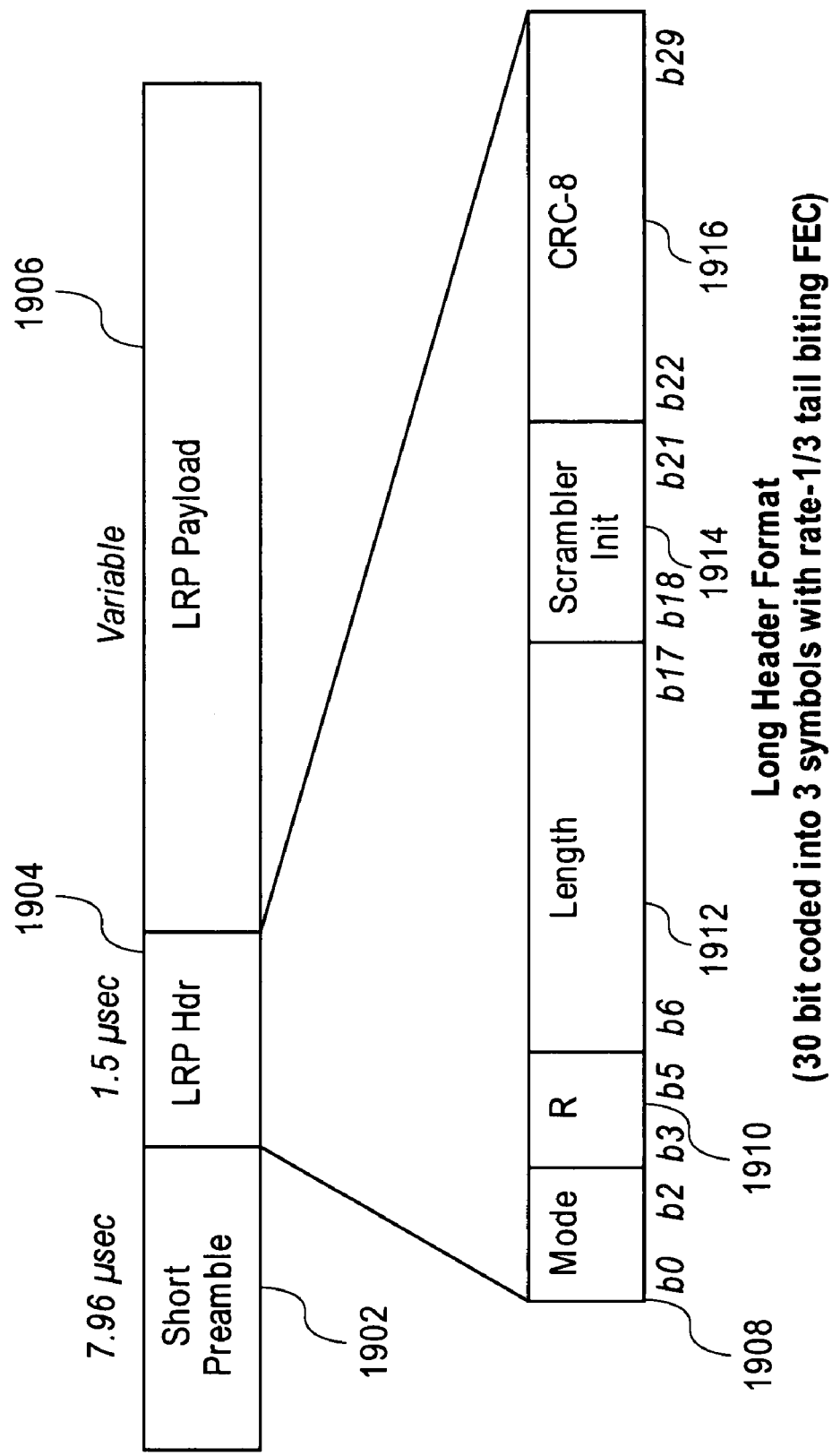
FIG. 19 is a block diagram of one embodiment of a format for a beam-formed low rate packet (LRP) data packet.

In LRP Beam-formed mode, the same technique as in HRP beam-forming may be used. This mode is the highest data rate but it is directional and requires beam updates. FIG. 19 illustrates one example of LRP Beam-formed data packet format 1900 comprising a short preamble 1902, a header 1904, and a payload 1906. The header 1904 may be 30 bit coded into 3 symbols with rate 1/3 tail biting convolutional code.

Figure 20:
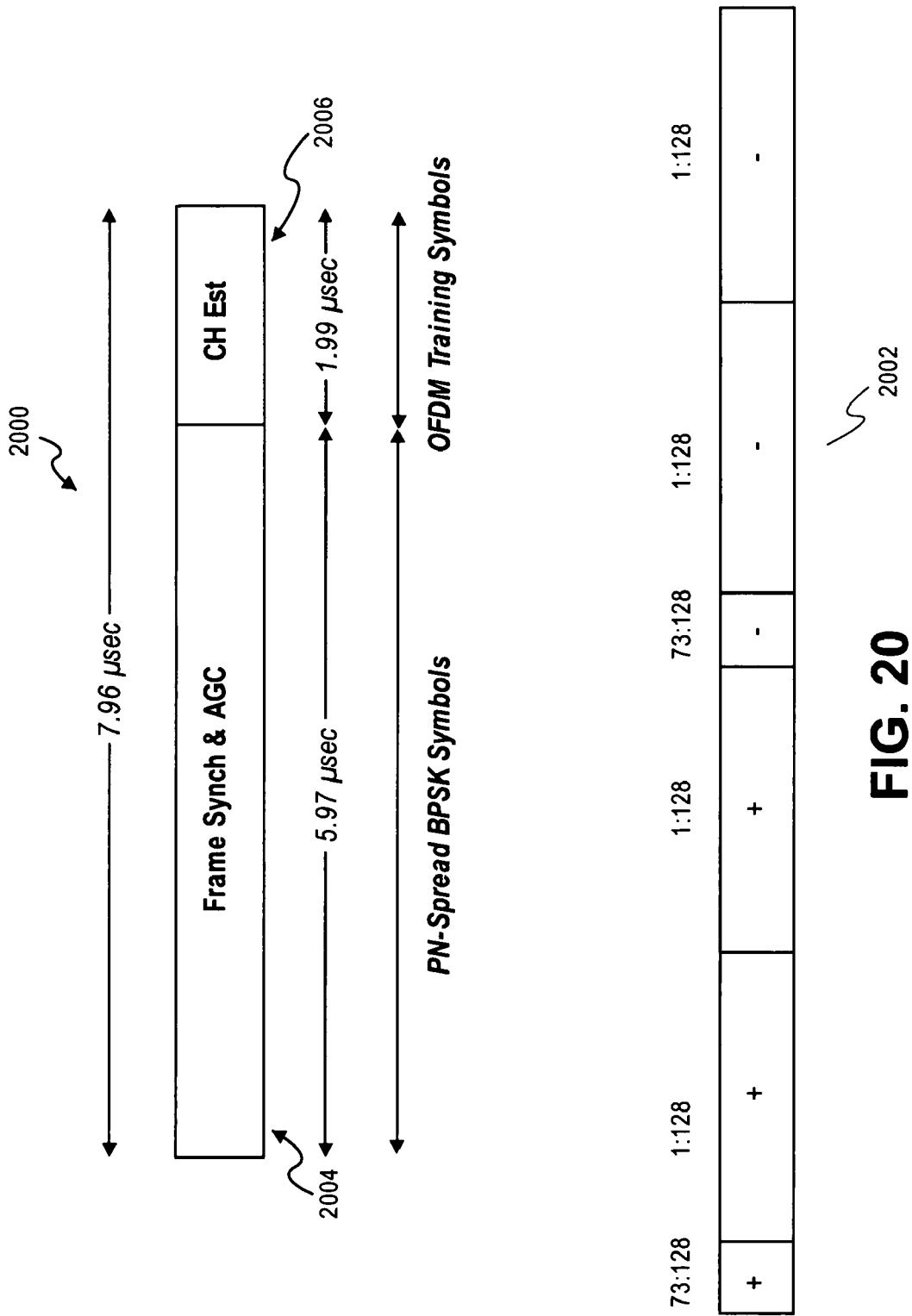
FIG. 20 is a block diagram of one embodiment of a preamble format for a beam-formed low rate packet (LRP) data packet.

The LRP Beam-formed preamble 1902 allows for blind timing synchronization, and has similar structure to HRP-PDU Preamble. FIG. 20 illustrates one embodiment of the LRP Beam-formed preamble 2000. The LRP Beam-formed preamble 2000 packet is 7.96 msec (2496 samples) long, and comprises two fields: Frame synch and AGC field 2004 and Channel Estimation field 2006.

Frame synch and AGC field 2004 consists of a sequence of BPSK chips with chip rate of 156.75 MHz (each chip is equal to 2 samples) that are filtered to comply with 91 MHz LRP transmission mask. Chip sequence is equal to 14 repetition of a 63-tap M-sequence to be specified for 936 chips, with the sequences modulated/multiplied respectively by [1 1 −1 −1 1 1 1 1 1 1 −1 −1 1 1 1].

Channel Estimation field 2006 is constructed by repeating the time-domain samples of the 128-tone OFDM training symbol, described by Table 35 in the frequency domain, as illustrated in sequence 2002 of FIG. 20, where the plus and minus sign mean that the corresponding samples are multiplied by 1 and −1 respectively.

In LRP Directional mode, the produced signal has a similar range as in forward channel, only requires "reverse direction" hardware (i.e. fewer Rx/Tx). In LRP directional mode, each signal is repeated multiple times using the best antenna pattern. In one embodiment, the best antenna patter is selected among the 8 possible antenna patterns used in the omnidirectional mode. In one embodiment, each signal is repeated 5 (=4+1) or 9 (=8+1) times. The optimal rx phase array pattern may be tracked for example, every 10 packets. The best TX diversity pattern is fed back to the back channel transmitter from the back channel receiver.

Figure 21A:
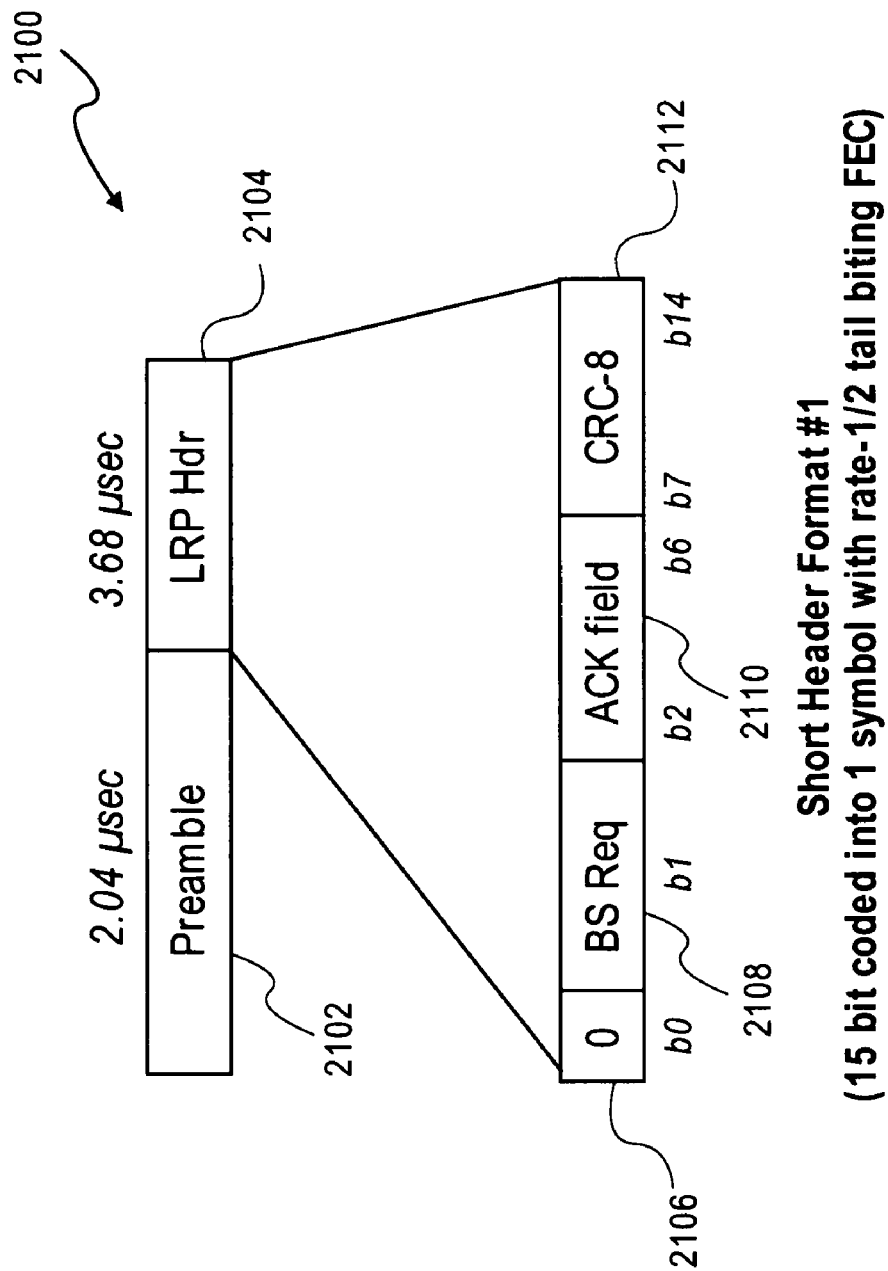
FIG. 21A is a block diagram of one embodiment of a format for a directional low rate packet (LRP) data packet without payload.
Figure 21B:
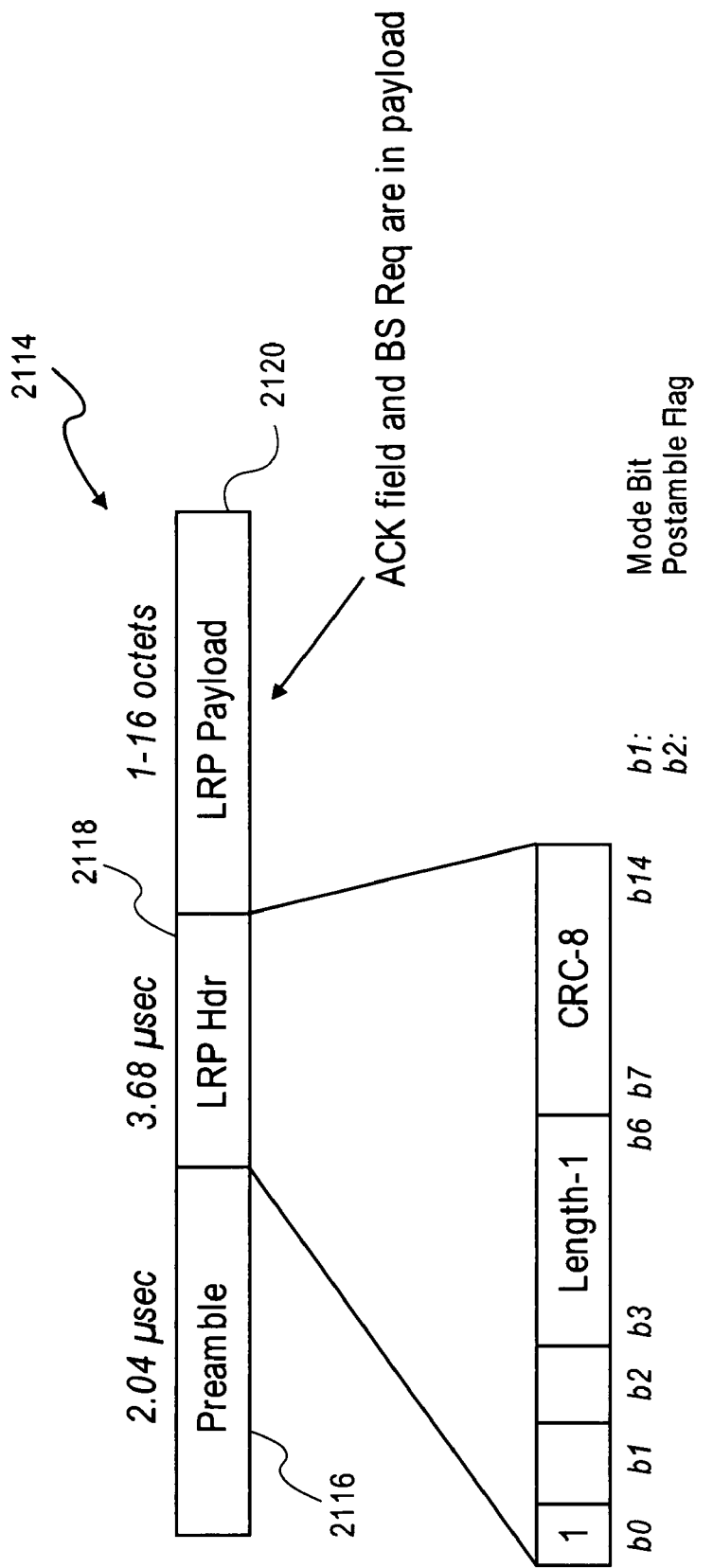
FIG. 21B is a block diagram of one embodiment of a format for a directional low rate packet (LRP) data packet with payload.

The line rates in the LRP Directional mode may be from about 5 to about 10 Mbps. Directional LRP packets may be used as ACK to acknowledge HRP or beam-formed LRP, data packets with or without additional payload. FIG. 21A illustrates a short 15-bit ACK header with no payload. FIG. 21B illustrates a 16-bit short ACK header with payload. The directional LRP short ACK header is encoded by rate-1/2 tail biting convolutional code and transmitted by 1 OFDM symbol. For Directional LRP packets with payload (second format), mode bit select one of following 2 non-beam-formed PHY data rates:

5 Mbps: Mode Bit=0
10 Mbps: Mode Bit=1

In LRP directional mode, the information is coded by rate-2/3 convolutional code. If tail biting can be used to reduce the number of OFDM symbol, tail biting is used. Otherwise, at least 6 consecutive zeroes are used to terminate the trellis for the convolutional code.

For these packets, Postamble Flag specifies whether a postamble is appended to the packet (flag=1), or not (flag=0).

Figure 22:
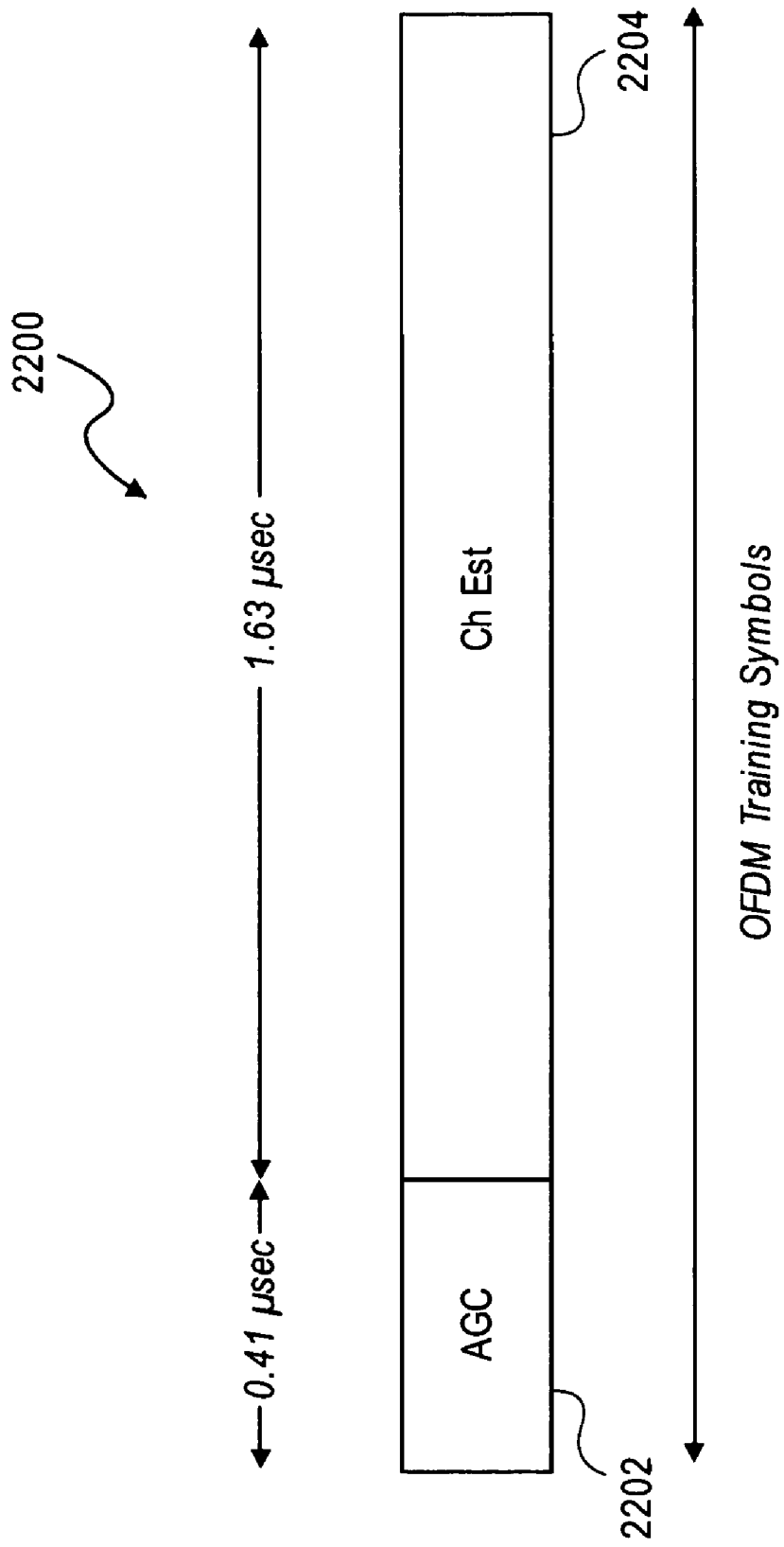
FIG. 22 is a block diagram of one embodiment of a format for a directional low rate packet (LRP) preamble.

FIG. 22 illustrates a directional LRP packet preamble 2200. LRPPDU Preamble for Directional packets is 2.04 msec (640 samples) long, and is comprised of 5 128-sample OFDM training symbols as shown here. The first symbol 2202 is used for AGC, and next 4 symbols are used for channel estimation and frequency offset estimation 2204. This preamble allows for limited (−/+150 nsec) timing uncertainty.

Figure 23:
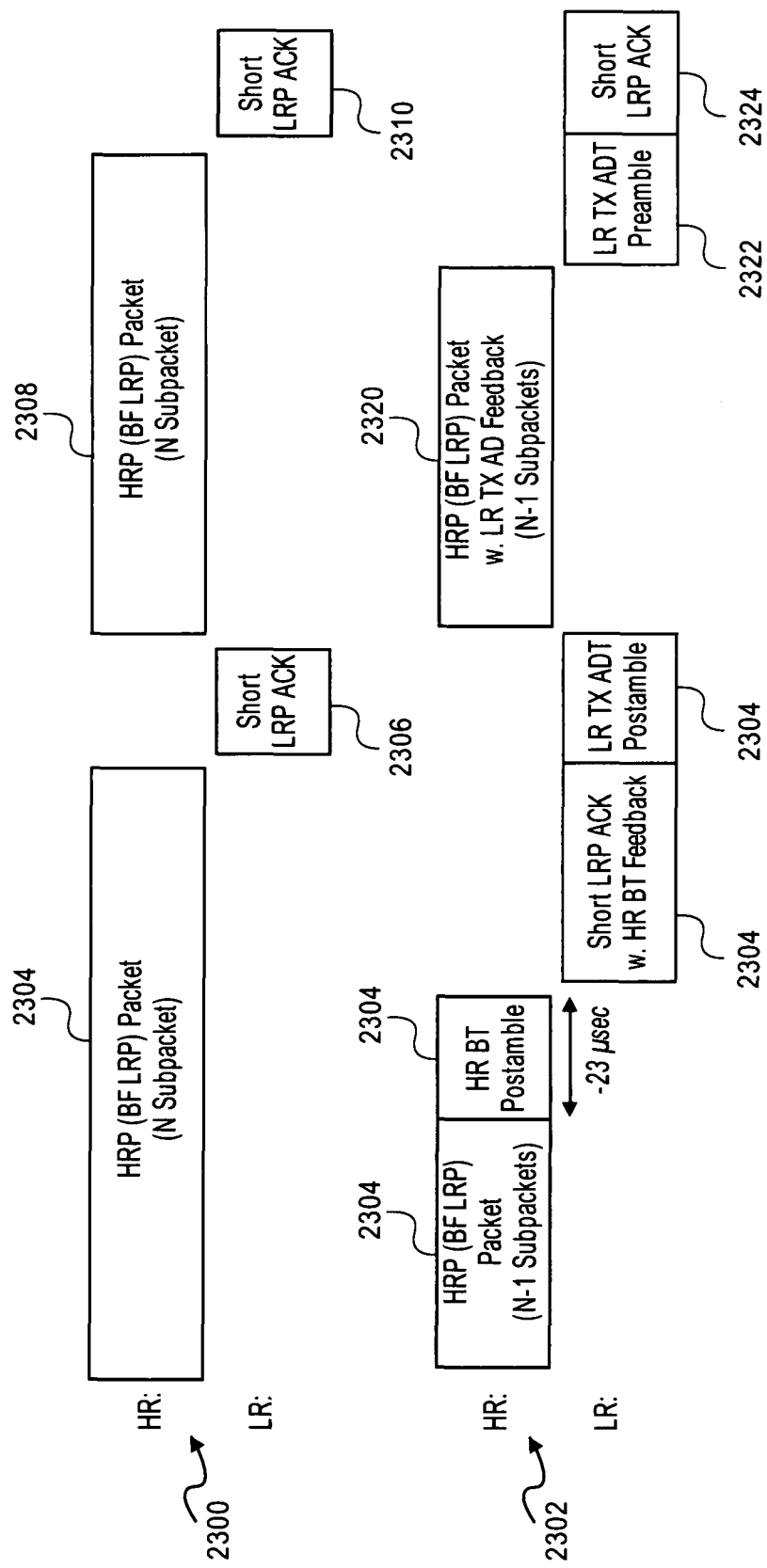
FIG. 23 is a block diagram of one embodiment of a format for directional low-rate packets (LRP) for antenna direction tracking.

FIG. 23 illustrates Antenna Direction Tracking for Directional LRP Packets. As mentioned, Directional LRP packets are used for Acknowledgement of HRP or Beam-formed (BF) LRP packets. These packets use the best TX antenna direction from a set of up to 8 antenna directions, where the optimum TX antenna direction needs to be tracked over time by using a special frame structure as described in FIG. 23. For every M regular HRP/Short-ACK, or Beam-formed-LRP/Short-ACK, frames may be formed as in 2300 of FIG. 23. There is a pair of HRP/Short-ACK, or Beam-formed-LRP/Short-ACK, frames with following special structure, where HR/LR Beam-Tracking, and LR Antenna Direction Tracking (ADT) take place as illustrated in 2302 of FIG. 23.

As shown Antenna Direction Tracking takes place in two stages: (1) selection of optimum TX Antenna Direction by using a dedicated postamble and (2) RX Beam-forming/tuning for the selected TX Antenna Direction by using a dedicated preamble. Between the above two stages, the selected Antenna Direction index is fed back from Short ACK RX to Short ACK TX via a HRP, or Beam-formed LRP, packet.

Figure 24:
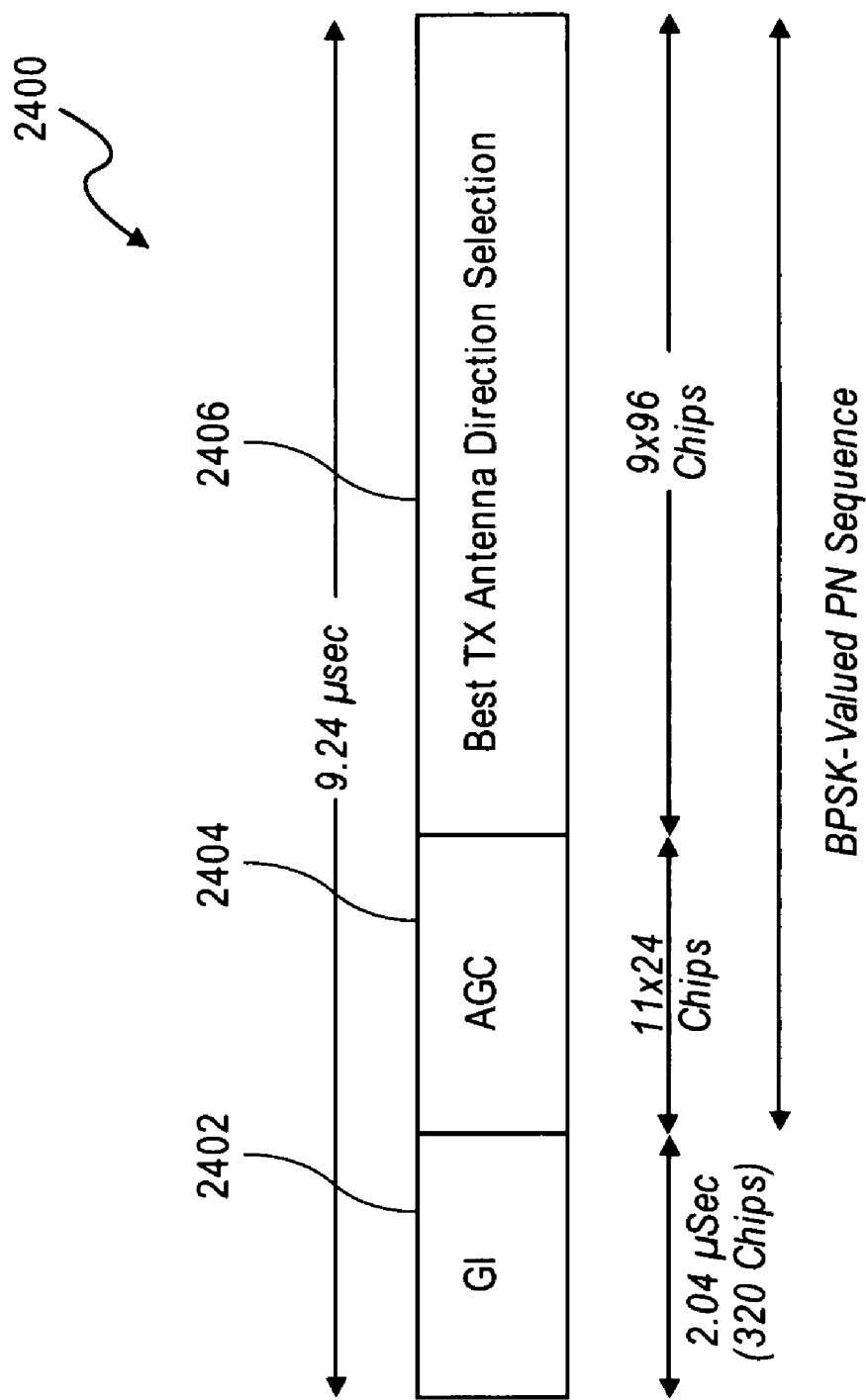
FIG. 24 is a block diagram of one embodiment of a postamble format for directional low-rate packets (LRP) for a transmitting antenna direction tracking.

FIG. 24 illustrates a Tx Antenna Direction Tracking Postamble 2400. TX Antenna Direction Tracking postamble for Directional LRPPDU is appended to a Directional LRP packet with payload. TX ADT postamble is 9.24 μsec (2896 samples) long, and, and is comprised three segments 2402, 2404, 2406. Two postamble fields 2404, 2406, follow a 2.04 msec Guard-Interval 2402 and consist of a sequence of BPSK chips with chip rate of 156.75 MHz (each chip is equal to 2 samples) that are filtered to comply with 91 MHz LRP transmission mask. The chip sequence is generated by repeating a 63-tap M-sequence to be specified. The second field 2404 is for AGC, which is 264 chips long. The third field 2406 is 864 chips long and is used to select the best TX diversity combination among 8 antennas. TX antenna phase array pattern changes at regular intervals of the postamble. For 8 TX antennas, TX phase array changes every 48, and 192 samples over each of the above 2 fields respectively.

Figure 25:
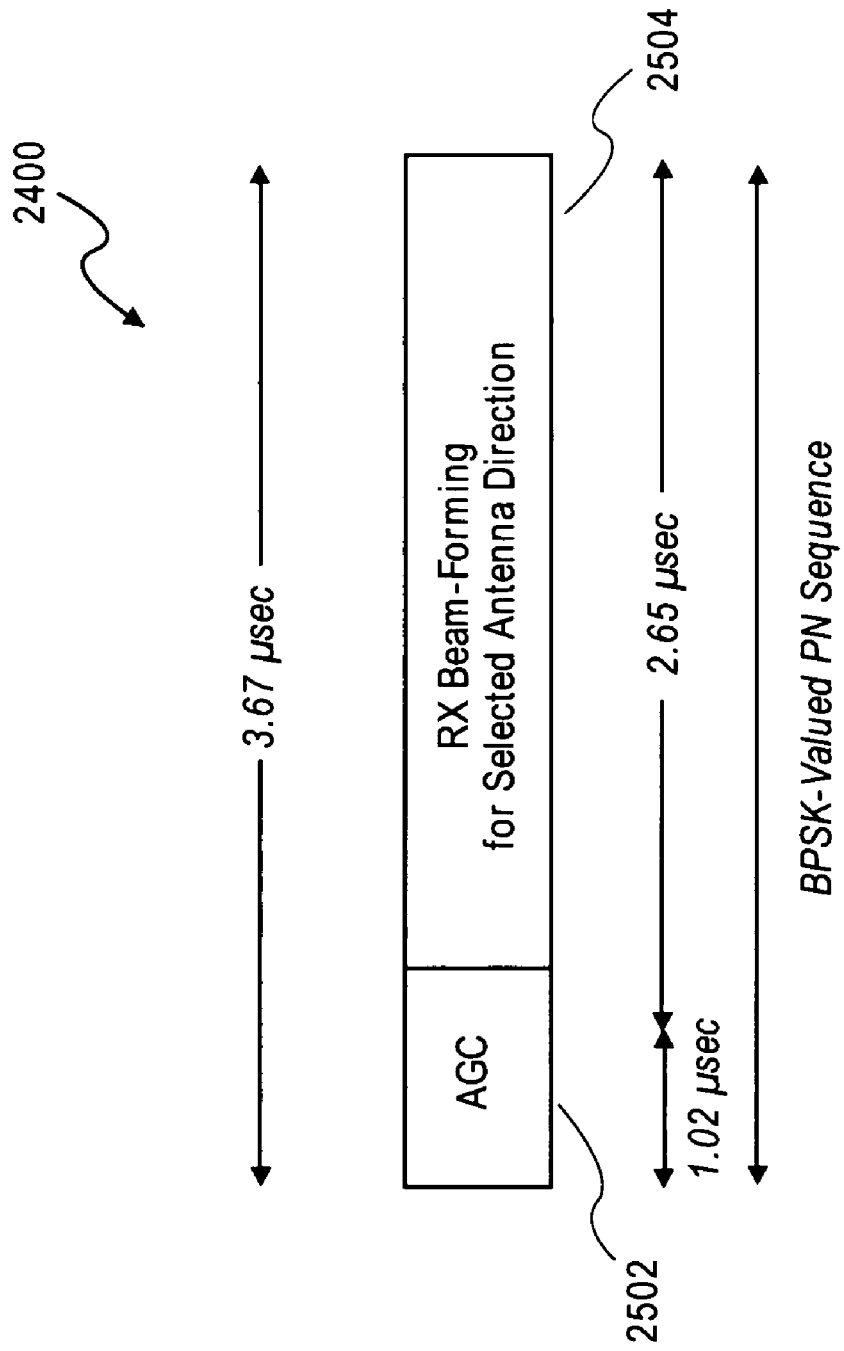
FIG. 25 is a block diagram of one embodiment of a preamble format for directional low-rate packets (LRP) for a receiving antenna direction tracking.

FIG. 25 illustrates a Tx Antenna Direction Tracking Preamble 2500. RX ADT Preamble is added to a Directional LRP packet with no payload, and is used for RX Beam-forming for selected TX Antenna Direction. This extra preamble is comprised of two segments 2502, 2504 (1152 Samples). The two fields consist of a sequence of BPSK chips with chip rate of 156.75 MHz (each chip is equal to 2 samples) that are filtered to comply with 91 MHz LRP transmission mask. The chip sequence is generated by repeating a 63-tap M-sequence to be specified. The first field 2502 is for AGC, which is 128 chips long. The second field 2504 is 448 chips long and is used to carry out RX Beam-Forming.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. An apparatus comprising:
   a processor;
   a radio frequency (RF) transmitter coupled to and controlled by the processor to transmit data;
   a physical layer circuit coupled to the RF transmitter to encode and decode between a digital signal and a modulated analog signal, the physical layer circuit comprising a high rate physical layer circuit (HRP) and a low rate physical layer circuit (LRP),
   wherein low rate channels generated by the low rate physical layer circuit (LRP) share a same frequency band as a corresponding high rate channel generated by the high rate physical layer circuit (HRP), wherein the HRP comprises an outer code circuit, an outer interleaver circuit, M inner encoders, where M is larger than 1 and the outer interleaver comprises a block interleaver that maps consecutive bytes of an outer code codeword to a different inner code, and maps the same byte in the outer code codeword to consecutive bits for the inner code; and
   wherein the LRP is operable to generate a LRP data packet for acknowledgement of HRP packets.

2. The apparatus of claim 1 wherein the high rate physical layer circuit (HRP) is to produce data rates in the order of gigabits per second, and the low rate physical layer circuit (LRP) is to produce data rates in the order of megabits per second.

3. The apparatus of claim 1 wherein three low rate channels generated by the low rate physical layer circuit (LRP) are allocated within one high rate channel generated by the high rate physical layer circuit (HRP).

4. The apparatus of claim 1 wherein the low rate channels and the high rate channels operate in time-division duplex (TDD).

5. The apparatus of claim 1 wherein the radio frequency (RF) transmitter comprises one crystal to generate immediate frequency (IF) and RF.

6. The apparatus of claim 1 wherein the high rate physical layer circuit (HRP) is to produce one or more wireless signal occupying about 1.7 GHz bandwidth.

7. The apparatus of claim 1 wherein the high rate physical layer circuit (HRP) is to produce a directional beam-formed signal for the RF transmitter.

8. The apparatus of claim 1 wherein the high rate physical layer circuit (HRP) is associated with the transmission of audio, video, data, and control messages.

9. The apparatus of claim 1 wherein the low rate physical layer circuit (LRP) further is to produce one or more wireless signals occupying a sub-channel of about 91 MHz bandwidth.

10. The apparatus of claim 1 wherein the low rate physical layer circuit (LRP) further is to produce a directional signal, an omni-directional signal, or a beam-formed signal for the RF transmitter.

11. The apparatus of claim 1 wherein the low rate physical layer circuit (LRP) is associated with control messages, beacons, acknowledgements, and low-speed data.

12. The apparatus of claim 1 wherein the HRP comprises an outer code circuit, an outer interleaver circuit, an inner code circuit, a bit interleaver circuit, a tone interleaver circuit, and a data scrambler circuit.

13. The apparatus of claim 1 wherein the LRP comprises a pilot tone circuit, a tone interleaver circuit, a Forward Error Correction (FEC) circuit, and a data scrambler circuit.

14. The apparatus of claim 1 wherein the LRP is configured to generate a LRP Long Omni data packet and a LRP Short Directional data packet.

15. The apparatus of claim 14 wherein the LRP Long Omni data packet comprises a LRP preamble, a LRP header, a LRP payload.

16. The apparatus of claim 15 wherein the LRP header is coded by a tail biting convolutional code.

17. The apparatus of claim 15 wherein the LRP preamble comprises a long Omni LRP preamble or a short Omni LRP preamble.

18. The apparatus of claim 17 wherein the long Omni LRP preamble is about 57 μsec long.

19. The apparatus of claim 14 wherein the LRP short directional data packet is configured for acknowledgement of HRP packets and beam-formed LRP packets.

20. An apparatus comprising:
    a processor;
    a radio frequency (RF) transmitter coupled to and controlled by the processor to transmit data; and
    a physical layer circuit coupled to the RF transmitter to encode and decode between a digital signal and a modulated analog signal, the physical layer circuit comprising a high rate physical layer circuit (HRP) and a low rate physical layer circuit (LRP), wherein the radio frequency (RF) transmitter comprises one crystal to generate immediate frequency (IF) and F, wherein the crystal generates four channels centers between about 57 GHz and about 66 GHz;
    wherein the low rate channels generated by the low rate physical layer circuit (LRP) share a same frequency band as a corresponding high rate channel generated by the high rate physical layer circuit (HRP).

21. The apparatus of claim 20 wherein the four channels comprises 58.608 GHz, 60.720 GHz, 62.832 GHz, and 64.944 GHz.

22. An apparatus comprising:
    a processor;
    a radio frequency (RF) transmitter coupled to and controlled by the processor to transmit data; and
    a physical layer circuit coupled to the RF transmitter to encode and decode between a digital signal and a modulated analog signal, the physical layer circuit comprising a high rate physical layer circuit (HRP) and a low rate physical layer circuit (LRP),
    wherein the low rate channels generated by the low rate physical layer circuit (LRP) share a same frequency band as a corresponding high rate channel generated by the high rate physical layer circuit (HRP), wherein the HRP comprise an outer code circuit, an outer interleaver circuit, and M inner code circuits,
    wherein M is larger than 1 and the outer interleaver comprises a block interleaver that maps consecutive bytes of the outer code codeword to different inner code, and maps the same byte in the outer code codeword to consecutive bits for the inner code.

23. The apparatus of claim 22 wherein the outer interleaver circuit is to further divide the input bytes into a group of consecutive M bytes, input the M bytes to consecutive bytes of the outer code, and map the M bytes to M different inner code.

24. The apparatus of claim 22 further comprising:
a bit interleaver circuit that maps bits from a same inner code to an equal number of Most Significant Bits (MSB and Least Significant Bits (LSBs) of the signal constellation.

25. An apparatus comprising:
a processor;
a radio frequency (RF) transmitter coupled to and controlled by the processor to transmit data; and
a physical layer circuit coupled to the RF transmitter to encode and decode between a digital signal and a modulated analog signal, the physical layer circuit comprising a high rate physical layer circuit (HRP) and a low rate physical layer circuit (LRP),
wherein the low rate channels generated by the low rate physical layer circuit (LRP) share a same frequency band as a corresponding high rate channel generated by the high rate physical layer circuit (HRP), wherein the LRP is configured to generate a LRP Long Omni data packet and a LRP Short Directional data packet, wherein the LRP Long Omni data packet comprises a LRP preamble, a LRP header, a LRP payload, wherein the LRP preamble comprises a long Omni LRP preamble or a short Omni LRP preamble, wherein the long Omni LRP preamble is configured for beacons and for LRP data packets with blind timing synchronization.

26. An apparatus comprising:
a processor;
a radio frequency (RF) transmitter coupled to and controlled by the processor to transmit data; and
a physical layer circuit coupled to the RF transmitter to encode and decode between a digital signal and a modulated analog signal, the physical layer circuit comprising a high rate physical layer circuit (HRP) and a low rate physical layer circuit (LRP),
wherein the low rate channels generated by the low rate physical layer circuit (LRP) share a same frequency band as a corresponding high rate channel generated by the high rate physical layer circuit (HRP), wherein the LRP is configured to generate a LRP Long Omni data packet and a LRP Short Directional data packet, wherein the LRP Long Omni data packet comprises a LRP preamble, a LRP header, a LRP payload, wherein the LRP preamble comprises a long Omni LRP preamble or a short Omni LRP preamble, wherein the long Omni LRP preamble comprises a first automatic gain control (AGC) and signal detection segment, a coarse frequency offset estimation (FOE) and timing recovery segment, a fine FOE and timing recovery segment, and a receiver beam-forming segment, a second AGC segment, and a channel estimation segment.

27. An apparatus comprising:
a processor;
a radio frequency (RF) transmitter coupled to and controlled by the processor to transmit data; and
a physical layer circuit coupled to the RF transmitter to encode and decode between a digital signal and a modulated analog signal, the physical layer circuit comprising a high rate physical layer circuit (HRP) and a low rate physical layer circuit (LRP),
wherein the low rate channels generated by the low rate physical layer circuit (LRP) share a same frequency band as a corresponding high rate channel generated by the high rate physical layer circuit (HRP), wherein the LRP is configured to generate a LRP Long Omni data packet and a LRP Short Directional data packet, wherein the LRP Long Omni data packet comprises a LRP preamble, a LRP header, a LRP payload, wherein the LRP preamble comprises a long Omni LRP preamble or a short Omni LRP preamble, wherein the short Omni LRP preamble is about 43 μsec long.

28. An apparatus comprising:
a processor;
a radio frequency (RF) transmitter coupled to and controlled by the processor to transmit data; and
a physical layer circuit coupled to the RF transmitter to encode and decode between a digital signal and a modulated analog signal, the physical layer circuit comprising a high rate physical layer circuit (HRP) and a low rate physical layer circuit (LRP),
wherein the low rate channels generated by the low rate physical layer circuit (LRP) share a same frequency band as a corresponding high rate channel generated by the high rate physical layer circuit (HRP), wherein the LRP is configured to generate a LRP Long Omni data packet and a LRP Short Directional data packet, wherein the LRP Long Omni data packet comprises a LRP preamble, a LRP header, a LRP payload, wherein the LRP preamble comprises a long Omni LRP preamble or a short Omni LRP preamble, wherein the short Omni LRP preamble is configured for contention period and for LRP data packets with timing synchronization.

29. An apparatus comprising:
a processor;
a radio frequency (RF) transmitter coupled to and controlled by the processor to transmit data; and
a physical layer circuit coupled to the RF transmitter to encode and decode between a digital signal and a modulated analog signal, the physical layer circuit comprising a high rate physical layer circuit (HRP) and a low rate physical layer circuit (LRP),
wherein the low rate channels generated by the low rate physical layer circuit (LRP) share a same frequency band as a corresponding high rate channel generated by the high rate physical layer circuit (HRP), wherein the LRP is configured to generate a LRP Long Omni data packet and a LRP Short Directional data packet, wherein the LRP Long Omni data packet comprises a LRP preamble, a LRP header, a LRP payload, wherein the LRP preamble comprises a long Omni LRP preamble or a short Omni LRP preamble, wherein the short Omni LRP preamble comprises a first automatic gain control (AGC) segment, a second AGC segment, a signal detection and time synch segment, a receiver beam-forming segment, a third AGC segment, and a channel estimation segment.

30. An apparatus comprising:
a processor;
a radio frequency (RF) transmitter coupled to and controlled by the processor to transmit data; and
a physical layer circuit coupled to the RF transmitter to encode and decode between a digital signal and a modulated analog signal, the physical layer circuit comprising a high rate physical layer circuit (HRP) and a low rate physical layer circuit (LRP),
wherein the low rate channels generated by the low rate physical layer circuit (LRP) share a same frequency band as a corresponding high rate channel generated by the high rate physical layer circuit (HRP), wherein the LRP is configured to generate a LRP Long Omni data packet, an LRP Beam-formed data packet, and a LRP Short Directional data packet, wherein the LRP Beam-formed data packet comprises a LRP Beam-formed preamble, a LRP Beam-formed header, and a LRP Beam-formed payload.

31. The apparatus of claim 30 wherein the LRP Beam-formed preamble comprises a frame synch and automatic gain control (AGC) segment, and a channel estimation segment.

32. An apparatus comprising:
a processor;
a radio frequency (RF) transmitter coupled to and controlled by the processor to transmit data; and
a physical layer circuit coupled to the RF transmitter to encode and decode between a digital signal and a modulated analog signal, the physical layer circuit comprising a high rate physical layer circuit (HRP) and a low rate physical layer circuit (LRP),
wherein the low rate channels generated by the low rate physical layer circuit (LRP) share a same frequency band as a corresponding high rate channel generated by the high rate physical layer circuit (HRP), wherein the LRP is configured to generate a LRP Long Omni data packet and a LRP Short Directional data packet, wherein the LRP short directional data packet comprises a LRP short directional preamble, and a LRP short directional header.

33. The apparatus of claim 32 wherein the LRP short directional data packet further comprises a LRP short directional payload.

34. The apparatus of claim 32 wherein the LRP short directional preamble comprises an automatic gain control (AGC) segment, and a channel estimation segment.

35. An apparatus comprising:
a processor;
a radio frequency (RF) transmitter having a digitally controlled phased array antenna coupled to and controlled by the processor to transmit data or content;
an interface to a wireless communication channel coupled to the processor to communicate antenna information relating to the use of the phased array antenna and to communicate information to facilitate receiving the data or playing the content at another location; and
a physical layer circuit coupled to the RF transmitter and the interface for encoding and decoding between a digital signal and a modulated analog signal, the physical layer circuit comprising a high rate physical layer circuit (HRP) and a low rate physical layer circuit (LRP),
wherein the low rate channels generated by the low rate physical layer circuit (LRP) share a same frequency band as a corresponding high rate channel generated by the high rate physical layer circuit (HRP); and
wherein the HRP comprises an outer code circuit, an outer interleaver circuit, M inner code circuits, where M is larger than 1 and the outer interleaver comprises a block interleaver that maps consecutive bytes of an outer code codeword to a different inner code, and maps the same byte in the outer code codeword to consecutive bits for the inner code.

36. The apparatus of claim 35 wherein the high rate physical layer circuit (HRP) is operable to produce data rates in the order of gigabits per second, and the low rate physical layer circuit (LRP) is to produce data rates in the order of megabits per second.

37. The apparatus of claim 35 wherein three low rate channels generated by the low rate physical layer circuit (LRP) are allocated within one high rate channel generated by the high rate physical layer circuit (HRP).

38. The apparatus of claim 35 wherein:
the high rate physical layer circuit (HRP) is to produce one or more wireless signal occupying about 1.7 GHz bandwidth;
the high rate physical layer circuit (HRP) is to produce data rates in the order of gigabits per second; and
the low rate physical layer circuit (LRP) is to produce data rates in the order of megabits per second.

39. The apparatus of claim 35 wherein the high rate physical layer circuit (HRP) is to produce a directional beam-formed signal for the RF transmitter.

40. The apparatus of claim 35 wherein the high rate physical layer circuit (HRP) is associated with the transmission of audio, video, data, and control messages.

41. The apparatus of claim 35 wherein the low rate physical layer circuit (LRP) is to produce one or more wireless signals occupying a sub-channel of about 91 MHz bandwidth.

42. The apparatus of claim 35 wherein the low rate physical layer circuit (LRP) is to produce a directional signal, an omni-directional signal, or a beam-formed signal for the RF transmitter.

43. The apparatus of claim 35 wherein the low rate physical layer circuit (LRP) is associated with control messages, beacons, acknowledgements, and low-speed data.

44. The apparatus of claim 35 wherein the HRP comprises an outer code circuit, an outer interleaver circuit, an inner code circuit, a bit interleaver circuit, a tone interleaver circuit, and a data scrambler circuit.

45. The apparatus of claim 35 wherein the outer interleaver circuit is to further divide the input bytes into a group of consecutive M bytes, input the M bytes to consecutive bytes of the outer code, and map the M bytes to M different inner code.

46. The apparatus of claim 45 further comprising:
a bit interleaver circuit that maps bits from a same inner code to an equal number of Most Significant Bits (MSB) and Least Significant Bits (LSB) of the signal constellation.

47. The apparatus of claim 35 wherein the LRP comprises a pilot tone circuit, a tone interleaver circuit, a Forward Error Correction (FEC) circuit, and a data scrambler circuit.

48. The apparatus of claim 35 wherein the LRP is configured to generate a LRP Long Omni data packet, a LRP Beam-formed data packet, and a LRP Short Directional data packet.

49. The apparatus of claim 48 wherein the LRP Long Omni data packet comprises a LRP preamble, a LRP header, a LRP payload.

50. The apparatus of claim 49 wherein the LRP header is coded by a tail biting convolutional code.

51. The apparatus of claim 49 wherein the LRP preamble comprises a long Omni LRP preamble or a short Omni LRP preamble.

52. The apparatus of claim 51 wherein the long Omni LRP preamble is about 57 µsec long.

53. The apparatus of claim 51 wherein the long Omni LRP preamble is configured for beacons and for LRP data packets with blind timing synchronization.

54. The apparatus of claim 51 wherein the long Omni LRP preamble comprises a first automatic gain control (AGC) and signal detection segment, a coarse frequency offset estimation (FOE) and timing recovery segment, a fine FOE and timing recovery segment, and a receiver beam-forming segment, a second AGC segment, and a channel estimation segment.

55. The apparatus of claim 51 wherein the short Omni LRP preamble is about 43 μsec long.

56. The apparatus of claim 51 wherein the short Omni LRP preamble is configured for contention period and for LRP data packets with timing synchronization.

57. The apparatus of claim 51 wherein the short Omni LRP preamble comprises a first automatic gain control (AGC) segment, a second AGC segment, a signal detection and time synch segment, a receiver beam-forming segment, a third AGC segment, and a channel estimation segment.

58. The apparatus of claim 48 wherein the LRP Beam-formed data packet comprises a LRP Beam-formed preamble, a LRP Beam-formed header, and a LRP Beam-formed payload.

59. The apparatus of claim 58 wherein the LRP Beam-formed preamble comprises a frame synch and automatic gain control (AGC) segment, and a channel estimation segment.

60. The apparatus of claim 58 wherein the LRP short directional data packet comprises a LRP short directional preamble, and a LRP short directional header.

61. The apparatus of claim 60 wherein the LRP short directional preamble comprises an automatic gain control (AGC) segment, and a channel estimation segment.

62. The apparatus of claim 58 wherein the LRP short directional data packet comprises a LRP short directional preamble, a LRP short directional header, and a LRP short directional payload.

63. The apparatus of claim 58 wherein the LRP short directional data packet is configured for acknowledgement of HRP packets and beam-formed LRP packets.

64. An apparatus comprising:
a processor;
a radio frequency (RF) transmitter coupled to and controlled by the processor to transmit content;
a physical layer circuit coupled to the RF transmitter and the processor for encoding and decoding between a digital signal and a modulated analog signal,
wherein the physical layer circuit comprises a low rate physical layer circuit (LRP) capable of operating in a directional mode or an omni-directional mode for the RF transmitter,
wherein in the omni-directional mode, the physical layer circuit is to generate a same signal replicated N times, each replication using a different TX antenna phase pattern, and wherein in the directional mode, the physical layer circuit is to generate a same signal replicated N+1 times, each replication uses a same optimal TX antenna phase pattern, the optimal TX antenna phase pattern feedback to a back channel transmitter from a back channel receiver.

65. The apparatus of claim 64 wherein the signal includes an orthogonal frequency division multiplex (OFDM) symbol, and N=8.

66. The apparatus of claim 64 wherein the signal includes an orthogonal frequency division multiplex (OFDM) symbol, and N=8.

67. The apparatus of claim 64 wherein the LRP is configured to generate a LRP Long Omni data packet, a LRP Beam-formed data packet, and a LRP Short Directional data packet.

68. The apparatus of claim 67 wherein the LRP short directional data packet is configured for acknowledgement of HRP packets and beam-formed LRP packets.

\* \* \* \* \*